(12) United States Patent
Lou et al.

(10) Patent No.: US 10,945,194 B2
(45) Date of Patent: Mar. 9, 2021

(54) TARGET CELL ACCESS METHOD AND DEVICE

(71) Applicant: HUAWEI TECHNOLOGIES CO., LTD., Guangdong (CN)

(72) Inventors: Chong Lou, Shanghai (CN); Rui Wang, Shanghai (CN); Mingzeng Dai, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/433,925

(22) Filed: Jun. 6, 2019

(65) Prior Publication Data

US 2019/0289528 A1   Sep. 19, 2019

Related U.S. Application Data

(63) Continuation of application No. PCT/CN2018/073924, filed on Jan. 24, 2018.

(30) Foreign Application Priority Data

Jan. 26, 2017   (CN) .......................... 201710061634.1

(51) Int. Cl.
*H04W 48/08*   (2009.01)
*H04W 76/15*   (2018.01)
(Continued)

(52) U.S. Cl.
CPC ............. *H04W 48/08* (2013.01); *H04W 8/16* (2013.01); *H04W 12/0013* (2019.01);
(Continued)

(58) Field of Classification Search
CPC ..... H04W 48/08; H04W 76/27; H04W 12/08; H04W 12/0051; H04W 76/15; H04W 48/16; H04W 12/0013; H04W 28/0268
See application file for complete search history.

(56) References Cited

U.S. PATENT DOCUMENTS

2010/0248727 A1* 9/2010 Karaoguz ............... H04L 45/00
455/442
2014/0242946 A1* 8/2014 Wu ........................ H04W 36/38
455/410
(Continued)

FOREIGN PATENT DOCUMENTS

CN   104811984 A   7/2015
CN   105471611 A   4/2016
(Continued)

OTHER PUBLICATIONS

3GPP TS 24.301 version 13.7.0 (Year: 2016).*
(Continued)

*Primary Examiner* — Un C Cho
*Assistant Examiner* — Yu-Wen Chang
(74) *Attorney, Agent, or Firm* — Fish & Richardson P.C.

(57) ABSTRACT

Embodiments of this application disclose a cell access method and a device, to provide a network slice service area identifier and network slice configuration information for a terminal device, so that the terminal device accesses a target cell. The method in the embodiments of this application includes: sending, by a serving access network device to a target access network device, a node addition request message to request the target access network device to allocate a resource for multi-connection operation for a terminal device; sending, by the target access network device to the serving network device, the an addition request acknowledgement message; sending, by the serving access network device, a radio resource control (RRC) connection recon-
(Continued)

figuration message to the terminal device; receiving, by the serving access network device, a RRC connection reconfiguration complete message from the terminal device; and sending, by the serving access network device, a message indicating that the terminal device has completed the radio resource configuration.

20 Claims, 13 Drawing Sheets

(51) Int. Cl.
| | |
|---|---|
| H04W 76/27 | (2018.01) |
| H04W 12/00 | (2021.01) |
| H04W 12/08 | (2021.01) |
| H04W 48/16 | (2009.01) |
| H04W 48/10 | (2009.01) |
| H04W 8/16 | (2009.01) |
| H04W 36/06 | (2009.01) |
| H04W 36/08 | (2009.01) |
| H04W 36/00 | (2009.01) |
| H04W 28/02 | (2009.01) |

(52) U.S. Cl.
CPC ....... *H04W 12/0051* (2019.01); *H04W 12/08* (2013.01); *H04W 36/00* (2013.01); *H04W 36/06* (2013.01); *H04W 36/08* (2013.01); *H04W 48/10* (2013.01); *H04W 48/16* (2013.01); *H04W 76/15* (2018.02); *H04W 76/27* (2018.02); *H04W 28/0268* (2013.01)

(56) References Cited

U.S. PATENT DOCUMENTS

| | | | | |
|---|---|---|---|---|
| 2015/0004984 | A1* | 1/2015 | Kim | H04W 36/0016 455/440 |
| 2015/0139195 | A1* | 5/2015 | Xiao | H04W 36/22 370/332 |
| 2015/0350896 | A1* | 12/2015 | Jeong | H04W 36/0016 455/410 |
| 2016/0165491 | A1* | 6/2016 | Liu | H04W 36/22 370/331 |
| 2016/0205547 | A1* | 7/2016 | Rajadurai | H04W 12/06 726/4 |
| 2016/0345190 | A1 | 11/2016 | Chen et al. | |
| 2016/0353367 | A1 | 12/2016 | Vrzic et al. | |
| 2017/0215062 | A1* | 7/2017 | Xu | H04W 76/11 |
| 2017/0223762 | A1* | 8/2017 | Worrall | H04W 24/10 |
| 2017/0303169 | A1* | 10/2017 | Hampel | H04W 36/0016 |
| 2017/0310592 | A1* | 10/2017 | Synnergren | H04L 45/38 |
| 2018/0014229 | A1* | 1/2018 | Chiba | H04W 36/08 |
| 2018/0199242 | A1* | 7/2018 | Deng | H04L 5/0098 |
| 2018/0249513 | A1* | 8/2018 | Chang | H04B 7/26 |
| 2018/0368140 | A1* | 12/2018 | Centonza | H04W 72/0426 |
| 2019/0021047 | A1 | 1/2019 | Zong | |
| 2019/0289528 | A1 | 9/2019 | Lou et al. | |
| 2019/0327782 | A1 | 10/2019 | Yang et al. | |

FOREIGN PATENT DOCUMENTS

| | | |
|---|---|---|
| CN | 105813195 A | 7/2016 |
| CN | 106060900 A | 10/2016 |
| CN | 106210042 A | 12/2016 |
| CN | 108307423 A | 7/2018 |
| CN | 108617025 A | 10/2018 |
| CN | 108566309 B | 8/2019 |
| EP | 2232743 B1 | 5/2013 |
| EP | 3557939 A1 | 10/2019 |
| JP | 2020504553 A | 2/2020 |
| WO | 2016020146 A1 | 2/2016 |
| WO | 2016021890 A1 | 2/2016 |
| WO | 2016108560 A1 | 7/2016 |
| WO | 2016185946 A1 | 11/2016 |
| WO | 2016192636 A1 | 12/2016 |
| WO | 2017012402 A1 | 1/2017 |
| WO | 2018128076 A1 | 7/2018 |

OTHER PUBLICATIONS

3GPP TS 36.331 version 13.0.0 (Year: 2016).*
S2-166664—Samsung, "Network slicing roaming support," SA WG2 Meeting #118, Reno, USA, Nov. 14-18, 2016, 7 pages.
3GPP TS 23.246 V14.1.0 (Dec. 2016), "3rd Generation Partnership Project; Technical Specification Group Services and System Aspects; Multimedia Broadcast/Multicast Service (MBMS); Architecture and functional description (Release 14)," Technical Specification, Dec. 2012, 76 pages.
3GPP TS 23.003 V14.2.0 (Dec. 2016), "3rd Generation Partnership Project; Technical Specification Group Core Network and Terminals; Numbering, addressing and identification (Release 14)," Technical Specification, Dec. 2016, 105 pages.
3GPP TS 26.346 V14.1.0 (Dec. 2016), "3rd Generation Partnership Project; Technical Specification Group Services and System Aspects; Multimedia Broadcast/Multicast Service (MBMS); Protocols and codecs (Release 14)," Technical Specification, Dec. 2016, 252 pages.
3GPP TS 23.501 V0.1.0 (Jan. 2017), "3rd Generation Partnership Project; Technical Specification Group Services and System Aspects; System Architecture for the 5G System; Stage 2 (Release 15)," Technical Specification, Jan. 2017, 67 pages.
PCT International Search Report and Written Opinion issued in International Application No. PCT/CN2018/073924 dated Apr. 23, 2018, 13 pages (partial English translation).
Office Action issued in Chinese Application No. 201810634171.8 dated Nov. 26, 2018, 8 pages.
Office Action issued in Chinese Application No. 201811544878.6 dated Dec. 23, 2019, 7 pages.
R2-162421—Nokia, Alcatel-Lucent Shanghai Bell, "Interface consideration for tight LTE/NR interworking anchored to NextGen Core," 3GPP TSG-RAN WG2 Meeting #93bis, Dubrovnik, Croatia, Apr. 11-15, 2016, 2 pages.
R3-161138—Huawei, "Requirements and functionalities of the interface between LTE and NR," 3GPP TSG-RAN3 Meeting #92, Nanjing, China, May 23-27, 2016, 5 pages.
R3-170065—ZTE, "Selection RAN Part Network Slice during UE mobility," 3GPP TSG RAN WG3 NR-adhoc, Spokane, USA, Jan. 17-19, 2017, 7 pages.
S3-161374—Huawei, HiSilicon, "pCR_amendment to security requirements and threats for key issue #8.3," 3GPP TSG SA WG3 (Security) Adhoc Meeting on FS_NSA, San Diego, USA, Sep. 27-29, 2016, 2 pages.
Search Report issued in Chinese Application No. 201811544878.6 dated Dec. 4, 2019, 3 pages.
R3-173768—Nokia, Nokia Shanghai Bell, "Text Proposal for Slice-based admission control at Secondary Node," 3GPP TSG-RAN WG3 #97bis, Prague, Czech Republic, Oct. 9-13, 2017, 8 pages.
R3-171889—Huawei, "Support of QoS and Slice for Option 7," 3GPP TSG-RAN WG3 #96, Hangzhou, China, May 15-19, 2017, 5 pages.
R3-173144—CMCC, "Slice Impact on Multi-Connectivity," 3GPP TSG-RAN WG3 #97, Berlin, Germany, Aug. 21-25, 2017, 3 pages.
3GPP TS 36.300 V14.1.0 (Dec. 2016), "3rd Generation Partnership Project; Technical Specification Group Radio Access Network; Evolved Universal Terrestrial Radio Access (E-UTRA) and Evolved Universal Terrestrial Radio Access getwork (E-UTRAN); Overall description; Stage 2 (Release 14)," Dec. 2016, 317 pages.
3GPP TR 38.801 V1.0.0 (Dec. 2016), "3rd Generation Partnership Project; Technical Specification Group Radio Access Network; Study on New Radio Access Technology; Radio Access Architecture and Interfaces (Release 14)," Dec. 2016, 72 pages.
3GPP TR 23.799 V14.0.0: (Dec. 2016), "3rd Generation Partnership Project; Technical Specification Group Services and System Aspects; Study on Architecture for Next Generation System (Release 14)," Dec. 2016, 572 pages.

(56) References Cited

OTHER PUBLICATIONS

Extended European Search Report issued in European Application No. 18744951.7 dated Jan. 8, 2020, 14 pages.
Nokia et al., "Correction of Selection of RAN part of Network Slice," 3GPP TSG-RAN WG3 Meeting #94, R3-162943; Reno, USA, Nov. 14-18, 2016, 4 pages.
Office Action issued in Chinese Application No. 201880008790.4 dated Mar. 13, 2020, 24 pages (with English translation).
Alcatel-Lucent et al., "Security functionality for dual connectivity," 3GPP TSG-SA3 Meeting #75, S3-140957, Sapporo, Japan, May 12-16, 2014, 7 pages.
Ericsson, "Solution for slice access management in UE registration area," 3GPP TSG-RAN WG3 Meeting #Ad Hoc, R3-170195, Spokane, Washington, USA, Jan. 17-19, 2017, 5 pages.
Ericsson, "UE context handling during inter RAT handover," 3GPP TSG-RAN WG2 #95-bis Tdoc, R2-166787, Kaohsiung, Taiwan, Oct. 10-14, 2016, 3 pages.
Office Action issued in Korean Application No. 2019-7018873 dated Aug. 11, 2020, 11 pages (with English translation).
Office Action issued in Japanese Application No. 2019-537844 dated Oct. 13, 2020, 6 pages (with English translation).
Office Action issued in Chinese Application No. 201710061634.1 dated Jan. 7, 2021, 4 pages.

\* cited by examiner

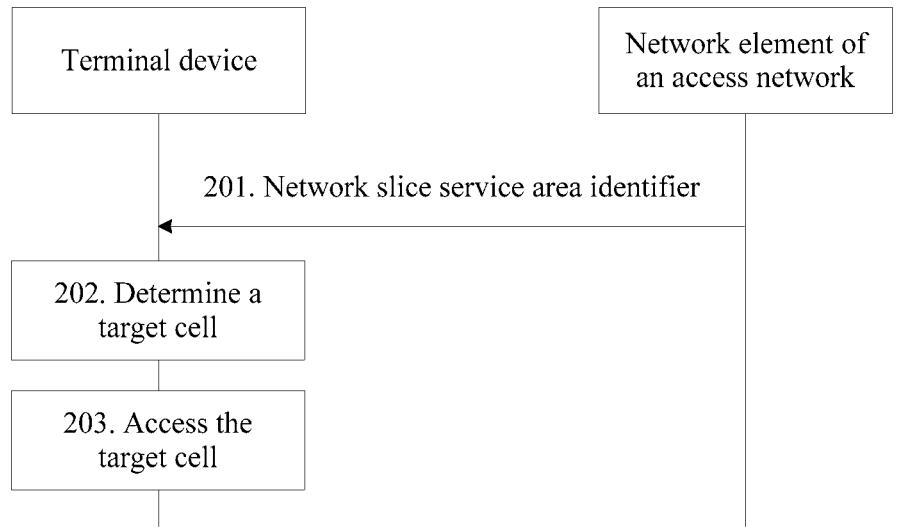
FIG. 2
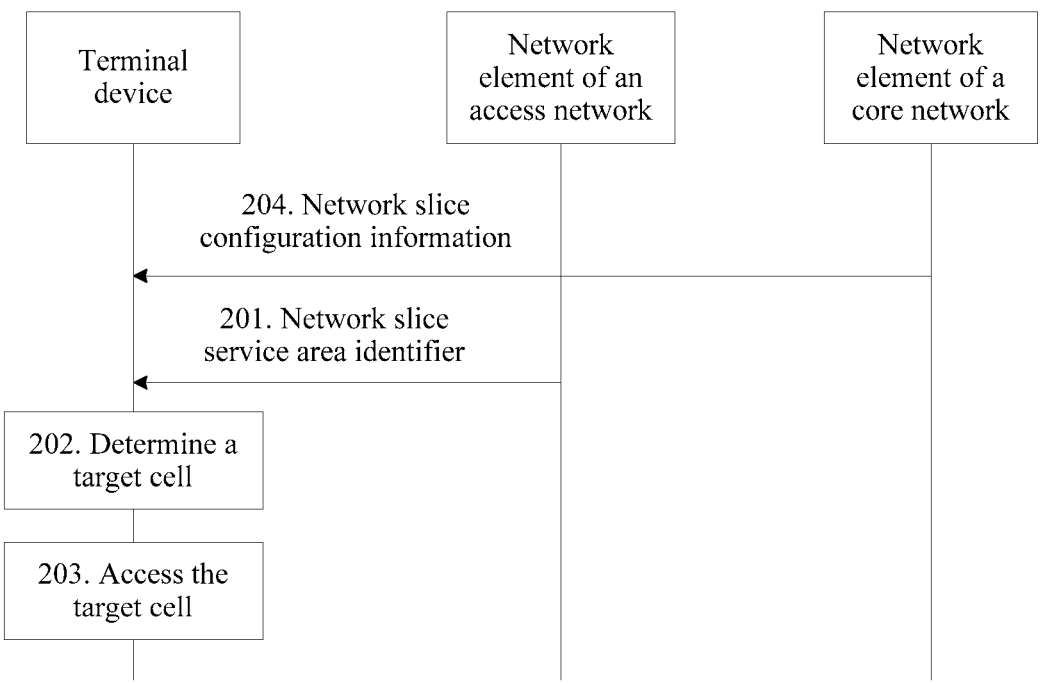
FIG. 2.1

TARGET CELL ACCESS METHOD AND DEVICE

CROSS-REFERENCE TO RELATED APPLICATIONS

This application is a continuation of International Application No. PCT/CN2018/073924, filed on Jan. 24, 2018, which claims priority to Chinese Patent Application No. 201710061634.1, filed on Jan. 26, 2017. The disclosures of the aforementioned applications are incorporated herein by reference in their entireties.

TECHNICAL FIELD

This application relates to the field of mobile communications, and in particular, to a target cell access method and a device.

BACKGROUND

An increasing quantity of user cases have noticeably different requirements for network performance. In a fifth generation (5G) mobile communications system, a concept of a network slice (NS) is proposed to construct a related network architecture.

Currently, according to the Third Generation Partnership Project (3GPP), main types of network slices in 5G are divided into the following three types: an Enhanced Mobile Broadband (eMBB) service, a massive machine type communications (mMTC) service, and an ultra-reliable and low latency communications (URLLC) service. The eMBB is mainly intended for a terminal with high requirements for a rate and mobility, such as a mobile phone or a multimedia device. The mMTC is mainly intended for an Internet of Things device with requirements for a large scale, low mobility, and a relatively low rate. The URLLC mainly refers to a service or a device type with harsh requirements for a latency and reliability, such as Internet of Vehicles and security information. For example, a mobile phone user may access a network slice of an eMBB type, to download at high speed or watch a 4K high-definition video. A sensor device may access a network slice of an mMTC type, to transmit a small data packet and update a system configuration. A user may simultaneously access one or more or all network slices, to meet a service requirement and achieve better user experience.

A procedure of selecting a network slice is divided into two steps: network slice guiding and network slice association.

Step 1 (network slice guiding): When a terminal device initiates network connection establishment to a selected public land mobile network (PLMN), a radio access network (RAN) forwards an establishment request of a user to a network slice selection module of a core network (CN). The module may query information about the terminal device such as subscription information related to a network slice, a service level agreement (SLA), load information, and a local configuration based on useful information provided by the terminal device such as a selected PLMN identifier, an identifier of the terminal device, and information about a CN capability supported by the terminal device, so as to select an appropriate network slice for the terminal device, and allocate an appropriate NSID to the terminal device. The terminal device stores the NSID. In addition, the network slice selection module notifies the RAN of configuration information corresponding to a selected network slice entity, such as a corresponding NF identifier, so that the RAN subsequently establishes CP and UP channels between the terminal device and the selected network slice.

Step 2 (network slice association): After the network slice guiding ends, when the terminal device re-initiates a network slice connection, for example, when the terminal device needs to initiate a service request due to a service requirement, the RAN selects a corresponding NF based on the NSID stored and reported by the terminal device and the locally-stored configuration information of the network slice entity, so as to establish CP and UP connections between the terminal device and a network slice instance corresponding to the terminal device.

A current network slice guiding manner is established based on an assumption that a network can definitely select an appropriate network slice for the terminal device. However, an actual network slice deployment case is not considered, and some network slices may be deployed only in a local network area. For example, a company establishes a network slice for employees of the company in an industrial park, to specially serve the employees of the company. Alternatively, a network slice is deployed in a stadium, so that when a user initiates a service in the stadium, the user may enjoy a better service, and service experience may be improved. In this case, when the terminal device moves, a serving cell changes, and it is difficult for the terminal device to continue enjoying a service of the network slice. Consequently, it is difficult to ensure service continuity and service experience of the network slice.

SUMMARY

Embodiments of this application provide a target cell access method and a device, to provide a network slice service area identifier and network slice configuration information for a terminal device, so that the terminal device accesses a target cell.

In view of this, a first aspect of the embodiments of the present invention provides a target cell access method, including:

A terminal device obtains a network slice service area identifier from a serving access network device corresponding to a serving cell in which the terminal device is located, where the network slice service area identifier is used to indicate an area served by a network slice. In the embodiments of this application, an identifier of a tracking area (TA) may be pre-allocated to each cell, for example, a TA identifier of a cell 1 is TA1. Different network slices have different service ranges. For example, a network slice 1 needs to cover TA1, TA2, and TA3, a network slice 2 needs to cover TA2, TA4, and TA5, and a network slice 3 covers only TA6. This is not limited herein. The terminal device determines a target cell based on network slice configuration information and the network slice service area identifier, where the network slice configuration information includes a correspondence among a network slice, an area, and a service. The terminal device accesses the target cell.

With reference to the first aspect of the present invention, in a first implementation of the first aspect of the present invention, the method includes: The terminal device obtains the network slice configuration information from a core network. Optionally, in some feasible embodiments, the network slice configuration information may be preconfigured in device storage of the terminal device or a storage unit of a subscriber identity module (SIM) card, or the configuration message may be sent to the terminal device by using a non-access stratum (NAS) message, and the terminal device stores the received network slice configuration information.

The core network and the terminal device exchange the network slice configuration information, and the serving access network device and the terminal device exchange the network slice service area identifier, so that the terminal device senses a service range of a network slice.

With reference to the first implementation of the first aspect of the present invention, in a second implementation of the first aspect of the present invention, the method includes:

The terminal device sends a request message to the core network, where the request message is used to request the network slice configuration information. In some feasible embodiments, the terminal device may establish a network connection to the serving access network device, for example, an RRC connection. After the network connection is established, the terminal device may perform uplink and downlink data communication with the serving access network device, and perform, by using the serving access network device, uplink and downlink data communication with a core network that serves the serving access network device. The terminal device receives the network slice configuration information from the core network.

The core network and the terminal device exchange the network slice service area identifier, so that the terminal device senses a service range of a network slice.

With reference to the first aspect of the present invention, in a third implementation of the first aspect of the present invention, the method includes:

The terminal device sends an indication message to the serving access network device, where the indication message is used to indicate a requirement for a network slice. The terminal device obtains the network slice service area identifier from the serving access network device. In the embodiments of this application, the terminal device may first synchronize with the serving access network device, for example, perform detection on a primary synchronization signal and a secondary synchronization signal, and perform correction in time domain and frequency domain, so as to obtain information such as a corresponding frequency channel number and bandwidth.

When the terminal device that is using a target service moves, even if the serving cell changes, the terminal device can determine the target cell based on the obtained network slice configuration information and the obtained network slice service area identifier, and continue enjoying the target service in the target cell, so that service continuity is ensured.

A second aspect of the embodiments of the present invention provides a target cell access method, including:

A serving access network device sends a connection indication to a target network device. The connection indication is used to instruct the target network device to connect to a terminal device. In the embodiments of this application, the serving access network device includes a serving access network device, and the target network device includes a serving access network device or a core network. When the serving access network device is a first serving access network device, and the target network device is a second RAN network element, in some feasible embodiments, the serving access network device initiates an interface establishment request to the target network device. The interface establishment request includes network slice information, and is used to exchange configurations on application sides of two connected serving access network devices. The serving access network device sends a target network slice service area identifier to the terminal device, where the target network slice service area identifier is used to indicate a target area, so that the terminal device determines a target cell based on network slice configuration information and the network slice service area identifier, where the network slice configuration information includes a correspondence among a network slice, an area, and a service.

With reference to the second aspect of the present invention, in a first implementation of the second aspect of the present invention, the method includes:

The serving access network device sends a handover request to the target network device, where the handover request includes the connection indication, used to initiate handover preparation. That the serving access network device sends a target network slice service area identifier to the terminal device includes: The serving access network device sends a handover command to the terminal device, where the handover command includes the target network slice service area identifier, and the handover command instructs the terminal device to handover to the target network device.

Network devices exchange network slice configuration information, so that a network device senses slice coverage information of a neighboring cell.

With reference to the second aspect of the present invention, in a second implementation of the second aspect of the present invention, the method includes:

The serving access network device sends a node addition request to the target network device, where the node addition request includes the connection indication. Two network devices may exchange a service area identifier of a network slice that is serving the terminal device or that is required by the terminal device, where the serving access network device may trigger the target network device to perform a multi-connection operation or directly modify information about the target network device. That the serving access network device sends a target network slice service area identifier to the terminal device includes: The serving access network device sends a connection reconfiguration message to the terminal device, where the connection reconfiguration message includes the target network slice service area identifier, and the connection reconfiguration message is used to instruct the terminal device to connect to the target network device.

Network devices exchange a service area identifier of a network slice that is serving the terminal device or that the terminal device is interested in, so that the target network device may consider the information to optimize mobility.

With reference to the second aspect of the present invention, in a third implementation of the second aspect of the present invention, the method includes:

The serving access network device sends a node modification request to the target network device, where the node modification request is used to instruct the target network device to modify a radio resource configuration of the target network device for the terminal device. In some feasible embodiments, two network devices may exchange a service area identifier of a network slice that is serving the terminal device or that is required by the terminal device, and a primary serving access network device triggers a secondary serving access network device to modify a current multi-connection operation. The serving access network device sends a connection reconfiguration message to the terminal device, where the connection reconfiguration message includes the radio resource configuration.

Network devices exchange a service area identifier of a network slice that is serving the terminal device or that the terminal device is interested in, so that the service access network triggers the target network device to perform the multi-connection operation or modify the target network device.

With reference to the second aspect of the present invention, in a fourth implementation of the second aspect of the present invention, the method includes:

The serving access network device receives anode modification request sent by the target network device. In some feasible embodiments, two network devices may exchange a service area identifier of a network slice that is serving the terminal device or that is required by the terminal device, and a secondary serving access network device initiates modification of a current multi-connection operation.

Network devices exchange a service area identifier of a network slice that is serving the terminal device or that the terminal device is interested in, so that a primary serving access network device triggers the target network device to modify the current multi-connection operation.

When the terminal device that is using a target service moves, even if a serving cell changes, the terminal device can determine the target cell based on the obtained network slice configuration information and the obtained network slice service area identifier, and continue enjoying the target service in the target cell, so that service continuity is ensured.

A third aspect of the embodiments of the present invention provides a terminal device, including:

a first obtaining module, configured to obtain a network slice service area identifier from a serving access network device corresponding to a serving cell in which the terminal device is located, where the network slice service area identifier is used to indicate an area served by a network slice; a determining module, configured to determine a target cell based on network slice configuration information and the network slice service area identifier, where the network slice configuration information includes a correspondence among a network slice, an area, and a service; and an access module, configured to access the target cell.

With reference to the third aspect of the present invention, in a first implementation of the third aspect of the present invention, the terminal device includes:

a second obtaining module, configured to obtain the network slice configuration information from a core network.

With reference to the third aspect of the present invention, in a second implementation of the third aspect of the present invention, the terminal device includes:

a first transmitting submodule, configured to send a request message to the core network, where the request message is used to request the network slice configuration information; and a receiving submodule, configured to receive the network slice configuration information from the core network.

With reference to the third aspect of the present invention, in a third implementation of the third aspect of the present invention, the terminal device includes:

a second transmitting submodule, configured to send an indication message to the serving access network device, where the indication message is used to indicate a requirement for a network slice; and an obtaining submodule, configured to obtain the network slice service area identifier from the serving access network device.

A fourth aspect of the embodiments of the present invention provides a serving access network device, including:

a first transmitting module, configured to send a connection indication to a target network device. The connection indication is used to instruct the target network device to connect to a terminal device; and a second transmitting module, configured to send a target network slice service area identifier to the terminal device, where the target network slice service area identifier is used to indicate a target area, so that the terminal device determines a target cell based on network slice configuration information and the network slice service area identifier, where the network slice configuration information includes a correspondence among a network slice, an area, and a service.

With reference to the fourth aspect of the present invention, in a first implementation of the fourth aspect of the present invention, the first transmitting module includes:

a first transmitting submodule, configured to send a handover request to the target network device, where the handover request includes the connection indication. The second transmitting module includes: a second transmitting submodule, configured to send a handover command to the terminal device, where the handover command includes the target network slice service area identifier, and the handover command instructs the terminal device to handover to the target network device.

With reference to the fourth aspect of the present invention, in a second implementation of the fourth aspect of the present invention, the first transmitting module includes:

a third transmitting submodule, configured to send a node addition request to the target network device, where the node addition request includes the connection indication. The second transmitting module includes: a fourth transmitting submodule, configured to send a connection reconfiguration message to the terminal device, where the connection reconfiguration message includes the target network slice service area identifier, and the connection reconfiguration message is used to instruct the terminal device to connect to the target network device.

With reference to the fourth aspect of the present invention, in a third implementation of the fourth aspect of the present invention, the serving access network device includes:

a third transmitting module, configured to send a node modification request to the target network device, where the node modification request is used to instruct the target network device to modify a radio resource configuration of the target network device for the terminal device; and a first receiving module, configured to send a connection reconfiguration message to the terminal device, where the connection reconfiguration message includes the radio resource configuration.

With reference to the fourth aspect of the present invention, in a fourth implementation of the fourth aspect of the present invention, the serving access network device includes:

a second receiving module, configured to receive a node modification request sent by the target network device.

A fifth aspect of the embodiments of the present invention provides a terminal device, including:

a transceiver, a memory, a processor, and a bus. The transceiver, the memory, and the processor are connected by using the bus. The transceiver is configured to obtain a network slice service area identifier from a serving access network device corresponding to a serving cell in which the terminal device is located, where the network slice service area identifier is used to indicate an area served by a network slice. The processor is configured to: determine a target cell based on network slice configuration information and the network slice service area identifier, where the network slice configuration information includes a correspondence among a network slice, an area, and a service; and access the target cell. The memory is configured to store a program, a target area, a target service, and the network slice configuration information.

A sixth aspect of the embodiments of the present invention provides a serving access network device, including:

a transceiver, a memory, a processor, and a bus. The transceiver, the memory, and the processor are connected by using the bus. The transceiver is configured to: send a connection indication to a target network device, where the connection indication is used to instruct the target network device to connect to a terminal device; and send a target network slice service area identifier to the terminal device, where the target network slice service area identifier is used to indicate a target area, so that the terminal device determines a target cell based on network slice configuration information and the network slice service area identifier, where the network slice configuration information includes a correspondence among a network slice, an area, and a service. The memory is configured to store a program, a target area, a target service, and the network slice configuration information. The processor is configured to execute a function of the serving access network device.

Another aspect of this application provides a computer readable storage medium. The computer readable storage medium stores an instruction. When the instruction is run on a computer, the computer executes the method in the foregoing aspects.

Another aspect of this application provides a computer program product that includes an instruction. When the instruction is run on a computer, the computer executes the method in the foregoing aspects.

It can be learned from the foregoing technical solutions that the embodiments of this application have the following advantages:

The terminal device obtains the network slice service area identifier from the serving access network device corresponding to the serving cell in which the terminal device is located, where the network slice service area identifier is used to indicate the area served by the network slice. The terminal device determines the target cell based on the network slice configuration information and the network slice service area identifier, where the network slice configuration information includes the correspondence among a network slice, an area, and a service. The terminal device accesses the target cell. Therefore, when the terminal device that is using the target service moves, even if the serving cell changes, the terminal device can determine the target cell based on the obtained network slice configuration information and the obtained network slice service area identifier, and continue enjoying the target service in the target cell, so that service continuity is ensured.

In addition, the serving access network device sends the connection indication to the target network device, where the connection indication is used to instruct the target network device to connect to the terminal device. The serving access network device sends the target network slice service area identifier to the terminal device, where the target network slice service area identifier is used to indicate the target area. The terminal device determines the target cell based on the network slice configuration information and the network slice service area identifier, where the network slice configuration information includes the correspondence among a network slice, an area, and a service. Therefore, when the terminal device that is using the target service moves, even if the serving cell changes, the terminal device can determine the target cell based on the obtained network slice configuration information and the obtained network slice service area identifier, and continue enjoying the target service in the target cell, so that service continuity is ensured.

BRIEF DESCRIPTION OF DRAWINGS

FIG. 2 is a schematic diagram of an embodiment of a target cell access method according to an embodiment of this application;

FIG. 2.1 is a schematic diagram of an embodiment of a target cell access method according to an embodiment of this application;

DESCRIPTION OF EMBODIMENTS

The embodiments of this application provide a target cell access method and a device, to provide a network slice service area identifier and network slice configuration information for a terminal device, so that the terminal device accesses a target cell.

To make persons skilled in the art understand the solutions in the embodiments of this application better, the following clearly and completely describes the technical solutions in the embodiments of this application with reference to the accompanying drawings in the embodiments of this application. Apparently, the described embodiments are merely some but not all of the embodiments of this application.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
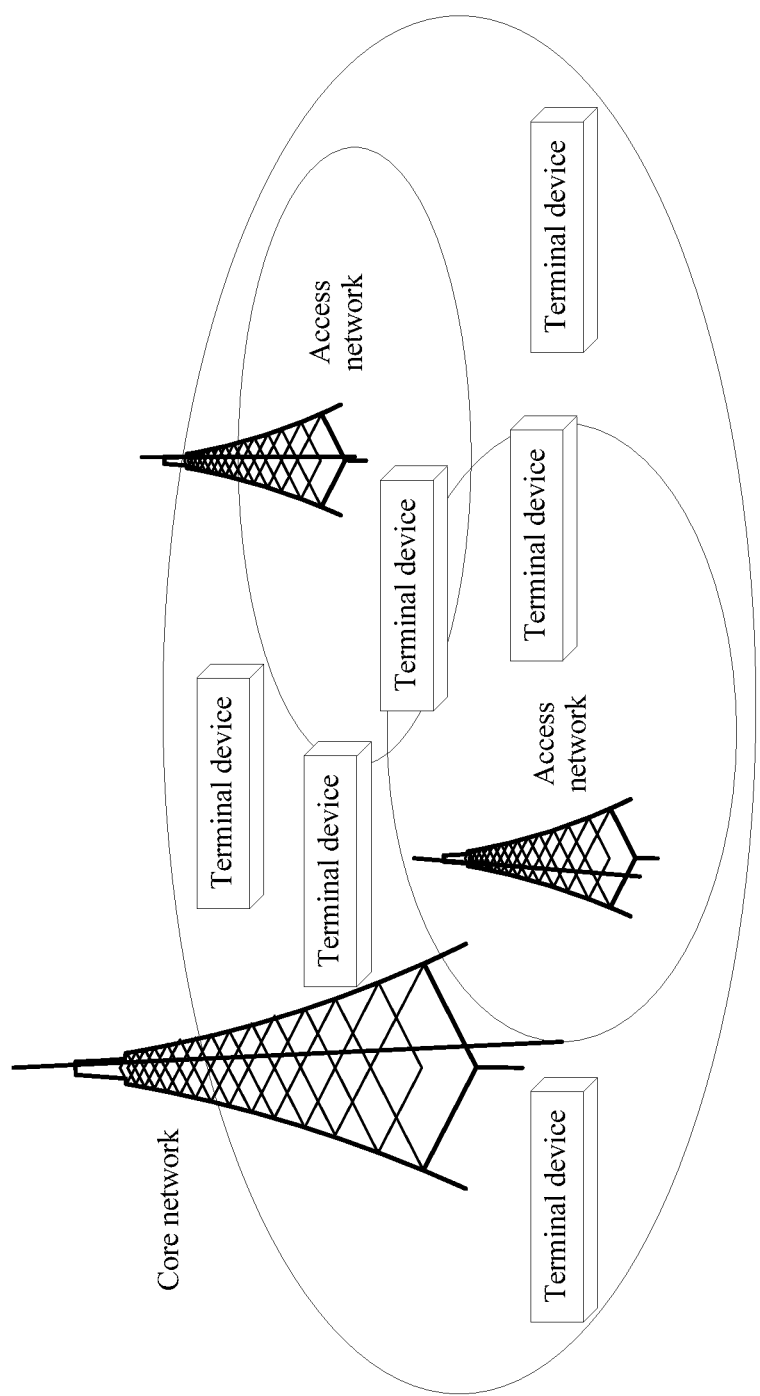
FIG. 1 is a schematic diagram of a framework of a network slice system according to an embodiment of this application.
Figure 3:
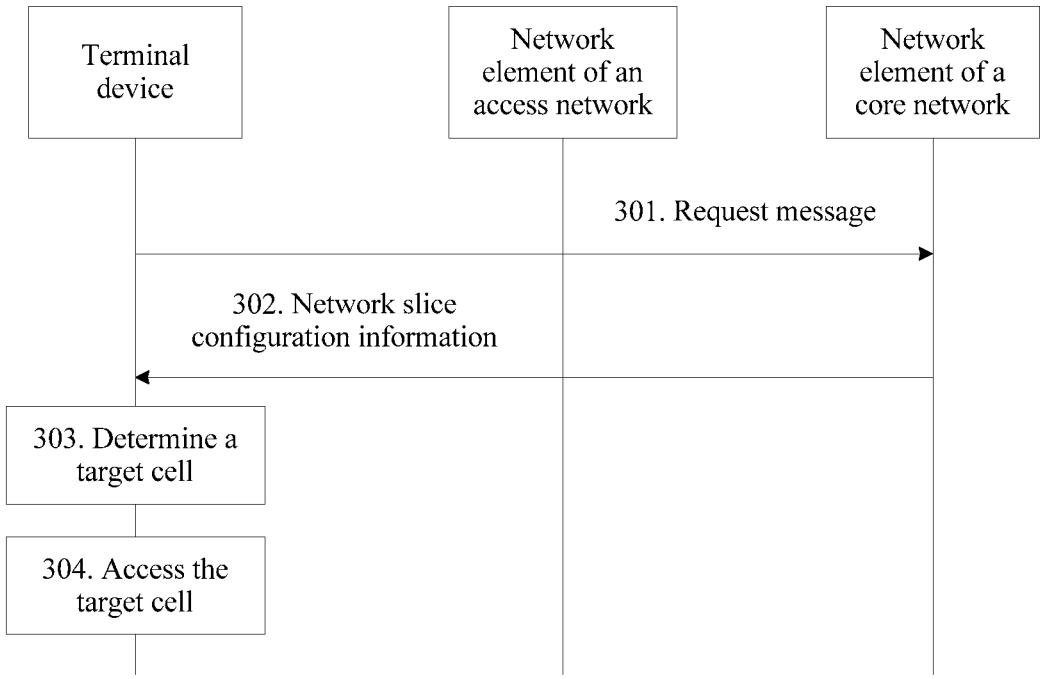
FIG. 3 is a schematic diagram of another embodiment of a target cell access method according to an embodiment of this application.
Figure 4:
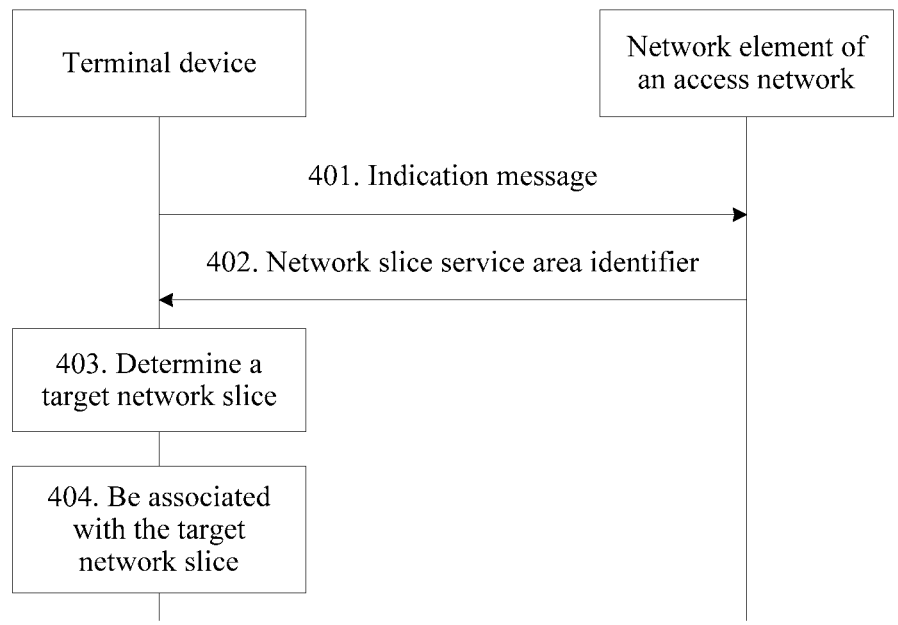
FIG. 4 is a schematic diagram of another embodiment of a target cell access method according to an embodiment of this application.

As shown in FIG. 1, FIG. 1 is a schematic architectural diagram of a network slice system. The network slice system includes a network device and a terminal, and the network device includes a core network and an access network. A Long Term Evolution (LTE) system is used as an example for description in the following.

It should be noted that when a terminal device is located in a coverage area of a cell (a carrier) provided by a macro base station or a micro base station, the terminal device communicates with the network device by using a transmission resource (for example, a frequency domain resource or a spectrum resource) used by the cell. The cell may be a cell corresponding to the network device, and the cell may belong to a macro cell, a hyper cell, or a beam, or may belong to a base station corresponding to a small cell. The small cell herein may include a metro cell, a micro cell, a pico cell, a femto cell, or the like. The small cell features a small coverage area and low transmission power, and is applicable to providing a data transmission service of a high rate. When there are a plurality of cells serving the terminal device, the terminal device may work in a coordinated multipoint transmission (CoMP) manner.

In an embodiment of this application, a function of the network slice system is implemented by using a software-defined networking (SDN) technology and a network function virtualization (NFV) technology as core technologies.

The NFV technology implements virtualization of an underlying physical resource, and loads a virtual network function (NF) to a general platform, such as a virtual machine. The SDN technology implements a logical connection between virtual machines, and constructs a path carrying signaling and a data flow. An end-to-end service link is configured by using dynamic connections between different NFs of a radio access network (RAN) and a core network (CN), so that a network slice is constructed. Based on requirements of specific commercial use cases for key performance indicator (KPI) such as a capacity, coverage, a rate, a latency, and reliability, an operator may form a specific network function set and network resources required for running these network functions, so that a required telecommunication service and a network capability service may be provided, thereby meeting a specific market scenario and requirement.

It should be noted that in the 3GPP, a current discussion related to a network architecture is mainly focused on network slice selection. The network slice selection aims to select an appropriate network slice for user equipment (UE), and associate the terminal device with a specific network slice, so as to establish a corresponding control plane (CP) and/or a user plane (UP) connection to the network slice.

In some feasible embodiments, when the terminal device needs to be associated with a network slice or handover a network slice, an appropriate network slice may be selected for and associated with the terminal device based on network slice guiding, that is, a corresponding network slice identifier (NSID) is allocated to the terminal device. Specifically, the NSID is selected for the terminal device in two network slice guiding manners, so as to implement a complete procedure of the network slice selection.

Guiding manner 1: A network slice identifier (NSID) is pre-configured in a universal subscriber identity module (USIM) card of the terminal device. Guiding manner 2: In a process in which the terminal device registers with a public land mobile network (PLMN), a network allocates an NSID to the terminal device.

The two manners are respectively corresponding to different scenarios. After the network slice guiding ends, the terminal device stores one NSID for each PLMN, and uses the NSID in the following process of communication with the PLMN, and the NSID is used by the network to associate the terminal device with a corresponding network slice.

This application is used to resolve a problem of how a serving access network device considers deployment of a network slice and mobility of a terminal device. That is, for a network slice restricted by a service area, the mobility of the terminal device is considered. When the terminal device moves, service continuity of the network slice for the terminal device is improved. Specifically, a terminal device in an idle state learns of information about a coverage area of a required network slice, so that the terminal device can increase a priority for selecting or reselecting cells covered by the required network slice, to access these cells as much as possible. In addition, when the terminal device has accessed the network slice, and moves to a coverage edge of a current cell, and handover needs to be performed between a source cell and a target cell, a source serving access network device needs to select an appropriate target serving access network device, to ensure that the target serving access network device can provide a service of the network slice accessed by the terminal device or re-select another network slice and ensure that a handover procedure is successfully performed.

In some feasible embodiments, this application is also applicable to a Universal Mobile Telecommunications System (UMTS) system, a CDMA system, a wireless local area network (WLAN), or a future 5G (the fifth generation) wireless communications system, such as a new radio (NR)

system or evolved LTE (eLTE) of a new radio access technology. That is, an access network device in the eLTE may simultaneously connect to a core network of the LTE, a core network of the future 5G, and the like.

In the embodiments of this application, the network device may be a device that is in an access network and that communicates with and connects to a terminal over an air interface by using a sector. The network device may be configured to mutually convert a received over-the-air frame and an Internet Protocol (IP) packet, and act as a router between the terminal device and a remaining part of the access network. The remaining part of the access network may include an IP network. The network device may further coordinate attribute management of the air interface. For example, the network device may be a base transceiver station (BTS) in a Global System for Mobile communications (GSM) or a Code Division Multiple Access (CDMA) technology; or may be a NodeB in Wideband Code Division Multiple Access (WCDMA); or may be an evolved NodeB (eNB, or e-NodeB, evolutional Node B) in the LTE. This is not limited herein.

In the embodiments of this application, a RAN device may be an access point (AP) in the WLAN or a base transceiver station (BTS) in the GSM or CDMA; or may be a NodeB (NB) in the WCDMA; or may be an evolved NodeB (Evolutional Node B, eNB or eNodeB) in the LTE, a relay station or an access point, an in-vehicle device, a wearable device, a network device in a future 5G network, or a network device in a future evolved PLMN network, for example, a base station, a transmission and reception point (TRP), a centralized unit (CU), or a distributed unit (DU) that can connect to a 5G core network device. A CN device may be a mobility management entity (MME) or a gateway in the LTE, or may be a control plane (CP) network function (NF) or a user plane (UP) network function in the 5G network, for example, a common control plane network function (CCNF) or a session management network function (SMF). The serving access network device may be a server, may greatly vary due to different configurations or different performance, and may include one or more central processing units (CPU) (for example, one or more processors) and a memory, and one or more storage media (for example, one or more mass storage devices) for storing application programs or data. The memory and the storage medium may be transient storage or persistent storage. A program stored in the storage medium may include one or more modules (not shown in the figure), and each module may include a series of instruction operations for a server. Further, the central processing unit may be configured to communicate with the storage medium, to perform, on the server, a series of instruction operations in the storage medium.

The server may further include one or more power supplies, one or more wired or wireless network interfaces, one or more input/output interfaces, and/or one or more operating systems such as Windows Server™, Mac OS X™, Unix™, Linux™, or FreeBSD™.

Particularly, it should be noted that the terminal device mentioned in the embodiments of this application may be a device that provides a user with voice and/or data connectivity, a handheld device with a radio connection function, or another processing device connected to a wireless modem. A wireless terminal may communicate with a core network through a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit ( ), a subscriber station, a mobile station, a mobile station, a remote station, an access point, a remote terminal, an access terminal), a user terminal, a terminal device, a user agent, a user device, or user equipment.

A mobile phone is used as an example, and a structure of the mobile phone may include components such as a radio frequency (RF) circuit, a memory, an input unit, a display unit, a sensor, an audio frequency circuit, a Wireless Fidelity (WiFi) module, a processor, and a power supply. Persons skilled in the art may understand that, the structure of the mobile phone shown in FIG. 11 does not constitute a limitation on the mobile phone, and the mobile phone may include more or fewer components than those shown in the figure, or combine some components, or have different component arrangements.

In the embodiments of this application, the terminal device obtains a network slice service area identifier from a serving access network device corresponding to a serving cell in which the terminal device is located, where the network slice service area identifier is used to indicate an area served by a network slice. The terminal device determines a target cell based on network slice configuration information and the network slice service area identifier, where the network slice configuration information includes a correspondence among a network slice, an area, and a service. The terminal device accesses the target cell. Therefore, when the terminal device that is using a target service moves, even if the serving cell changes, the terminal device can determine the target cell based on the obtained network slice configuration information and the obtained network slice service area identifier, and continue enjoying the target service in the target cell, so that service continuity is ensured.

In addition, the serving access network device sends a connection indication to a target network device, where the connection indication is used to instruct the target network device to connect to the terminal device. The serving access network device sends a target network slice service area identifier to the terminal device, where the target network slice service area identifier is used to indicate a target area, so that the terminal device determines the target network device based on the target area, the target service, and the pre-obtained network slice configuration information, and accesses a target cell served by a target network. Therefore, when the terminal device that is using the target service moves, even if the serving cell changes, the terminal device can determine the target cell based on the obtained network slice configuration information and the obtained network slice service area identifier, and continue enjoying the target service in the target cell, so that service continuity is ensured.

For ease of understanding, the following describes a specific procedure in the embodiments of this application. The terminal device obtains network slice information in different manners, and the manners are separately described in the following.

I. The terminal device separately obtains related information from a core network and a serving access network device.

Referring to FIG. 2, an embodiment of a target cell access method in an embodiment of this application includes the following steps.

201. The terminal device obtains a network slice service area identifier from a serving access network device corresponding to a serving cell in which the terminal device is located, where the network slice service area identifier is used to indicate an area served by a network slice.

In some feasible embodiments, the serving access network device may further send network slice service area identification information to the terminal device. It should be noted that the network slice service area identifier stored by the serving access network device may be preconfigured by a network management system such as an operation, administration, and maintenance (OAM) entity, or may be preconfigured by an application layer function entity. This is not limited herein. It should be noted that the terminal device may obtain one or more network slice service area identifiers. This is not limited herein.

Further, in some feasible embodiments, the network slice service area identification information may be a system message sent by using a radio resource control (RRC) message, and the system message may be included in an existing system message block as a newly-added field, or may be used as a new system message block and sent to the terminal device. This is not limited herein. The network slice service area identification information may alternatively be a dedicated message for the terminal device sent by using an RRC message, and only the terminal device can correctly receive and decode the message, so that another terminal device cannot receive the message in this case.

Further, in some feasible embodiments, at least one network slice identifier included in the network slice service area identification information may be sorted based on a priority, that is, a network slice service area priority. The network slice service area priority is used to indicate a priority corresponding to the network slice service area identifier, for example, a priority of a network slice service area A is higher than that of a network slice service area B.

Further, in some feasible embodiments, the network slice service area identifier may indicate a coverage area of a network slice, and the network slice may cover a group of cells in one PLMN. Each cell may belong to one or more network slice service areas. The network slice service area identifier may further indicate that the network slice covers all cells in the entire PLMN.

Further, the network slice service area identifier may be a specific predefined value, or may be a group of cell identifiers, a group of serving access network device identifiers, or a tracking area (TA) TA identifier list.

Further, in some feasible embodiments, after receiving the network slice service area identifier, the terminal device may determine a coverage area of a network slice corresponding to the identifier, and may determine a service or a service type that may be provided by the network slice.

Further, in some feasible embodiments, the network slice service area identification information includes but is not limited to the following related information: information about a frequency channel number of each frequency in a same frequency list or different frequency list supported by a cell; and a network slice service area identifier supported by the frequency channel number, where the network slice service area identifier is used to uniquely identify a network slice service area, and the area may be a sector, a beam, a cell, a tracking area, a paging area, a serving access network device station, a transmission and reception point (TRP), a distributed unit (DU), a centralized unit (CU), or the like. This is not limited herein.

In some feasible embodiments, information about a frequency channel number of each frequency in a same frequency list or different frequency list supported by a neighboring cell and a network slice service area identifier supported by the frequency channel number are used to uniquely identify a network slice service area. The area may be a sector, a beam, a cell, a tracking area, a paging area, a serving access network device station, a TRP, a DU, a CU, or the like. This is not limited herein.

It should be noted that there may be many divided cells of a serving access network device. For example, a base station has many antennas, and each antenna may form a sector-shaped cell. A cell that the terminal device accesses and information about the cell are included herein.

202. The terminal device determines a target cell based on network slice configuration information and the network slice service area identifier, where the network slice configuration information includes a correspondence among a network slice, an area, and a service.

In some feasible embodiments, the terminal device may use the received network slice configuration information and the received network slice service area identification information as a standard for cell selection and reselection. Further, for a terminal device that is being served by the service, the service type, and/or the network slice, the terminal device may set, to a highest priority, an identifier of a current camping cell that can provide the service and/or a frequency and a frequency channel number of the current camping cell. When performing cell reselection, the terminal device may preferentially reselect a cell corresponding to the cell identifier, and/or a cell corresponding to the frequency and the frequency channel number.

Further, for a terminal device that needs to be served by the service, the service type, and/or the network slice, when the terminal device expects to be served by the service, the service type, and/or the network slice, the terminal device may set, to a highest priority, an identifier of a current camping cell that can improve the service and/or a frequency and a frequency channel number of the current camping cell. When performing cell reselection, the terminal device may preferentially reselect a cell corresponding to the frequency and the cell identifier, and/or a cell corresponding to the frequency channel number.

Further, when there is no service, service type, and/or network slice required by the terminal device, for example, a session ends, the terminal device no longer sets, to the highest priority, the frequency and the frequency channel number of the current camping cell that can improve the service.

203. The terminal device accesses the target cell.

204. The terminal device obtains the network slice configuration information from the core network.

Optionally, referring to FIG. 2.1, this embodiment may further include step 204, and step 204 is performed before step 201.

In this embodiment of this application, an identifier of a tracking area (TA) may be pre-allocated to each cell, for example, a TA identifier of a cell 1 is TA1. Different network slices have different service ranges. For example, a network slice 1 needs to cover TA1, TA2, and TA3, a network slice 2 needs to cover TA2, TA4, and TA5, and a network slice 3 covers only TA6. This is not limited herein.

In this embodiment of this application, the terminal device may receive network slice configuration information sent by the core network or a function entity related to an application layer or a service layer, where the network slice configuration information includes a correspondence between a network slice and a service. Specifically, for example, the network slice configuration information indicates that the network slice 1 can provide a service 1, a service 2, and a service 3, and the network slice 2 can provide a service 3, a service 4, and a service 5.

Optionally, in some feasible embodiments, the network slice configuration information may be preconfigured in device storage of the terminal device or a storage unit of a subscriber identity module (SIM) card, or the configuration message may be sent to the terminal device by using a non-access stratum (NAS) message, and the terminal device stores the received network slice configuration information.

Further, in some feasible embodiments, the network slice configuration information may further include but is not limited to the following related information: a service, for example, a video, a sports program, or a television channel, or a service type corresponding to one or more services, for example, an identifier corresponding to a video type service, such as a temporary mobile group identity (TMGI), used to indicate the service, the channel, or the service type; a time at which a session corresponding to a service or a service type starts and/or ends, used to indicate a time at which the service starts or ends; frequency information corresponding to a service or a service type, used to indicate a frequency or a frequency channel number only or at least at which the service or the service type can provide a service; a network slice service area identifier corresponding to a service or a service type, where the service may be corresponding to one or more network slice service area identifiers, and the service may be enjoyed only in cells corresponding to the network slice service area identifiers; network slice identification information corresponding to a service or a service type; and a network slice identifier that is allocated to a network slice and indicated by network slice identification information.

The network slice identification information corresponding to a service or a service type may include but is not limited to: a network slice type, such as information indicating a network slice type, for example, enhanced mobile broadband (eMBB), ultra-reliable and low latency communications (URLLC), or massive machine type communications (mMTC), where the network slice type may further be an end-to-end network slice type, including a RAN and the CN, or may be a network slice type of the serving access network device, or a network slice type of the core network; a service type, related to a specific service, such as information indicating a service feature or a specific service, for example, a video service, an Internet of Vehicles service, or a voice service; tenant information, used to indicate information about a customer establishing or leasing a network slice, for example, Tencent or State Grid; terminal device group information, used to indicate information about a group into which a user is grouped based on a feature such as a level of the user; slice group information, used to indicate an instance identifier that the terminal device may access based on a feature, or used to indicate an instance identifier and feature information, for example, an identifier is allocated to a network slice instance and is used to indicate the network slice instance, or a new identifier is mapped based on a network slice instance identifier, the identifier is associated with the network slice instance, and a receiver may identify a represented specific network slice instance based on the identifier; and a dedicated core network (DCN) identifier, where the identifier is used to uniquely indicate a dedicated core network, for example, a dedicated core network of the Internet of Things, and optionally, there may be a mapping relationship between a DCN identifier and a network slice identifier, the network slice identifier may be obtained based on the mapped DCN identifier, and the DCN identifier may be obtained based on the mapped network slice identifier. In some feasible embodiments, the network slice configuration information may further include other required information. This is not limited herein.

It should be noted that after receiving the network slice configuration information, the terminal device may store the network slice configuration information, and synchronize with a connected serving access network device, for example, perform detection on a primary synchronization signal and a secondary synchronization signal, and perform correction in time domain and frequency domain, so as to obtain information such as a corresponding frequency channel number and bandwidth. In other words, the terminal device synchronizes with the serving access network device in both time domain and frequency domain. For example, when a base station needs to send information, the terminal device needs to obtain a precise moment at which the information is sent. In some feasible embodiments, the terminal device needs to synchronize with the RAN before the terminal device initiates communication with the RAN.

II. The terminal device obtains related information from a core network.

301. The terminal device sends a request message to the core network, where the request message is used to request network slice configuration information.

In some feasible embodiments, the terminal device may establish a network connection to a serving access network device, for example, an RRC connection. After the network connection is established, the terminal device may perform uplink and downlink data communication with the serving access network device, and perform, by using the serving access network device, uplink and downlink data communication with a core network that serves the serving access network device.

Optionally, in some feasible embodiments, the terminal device sends the request message to the core network. In some feasible embodiments, the message may be a NAS message, for example: an attach request, used to request the terminal device to attach to or register with the CN; a service request, used to request the terminal device to establish a service with the CN; a session establishment request, used to request the terminal device to establish a session with the CN; or a tracking area update request, used to request the terminal device and the CN to update a tracking area when the terminal device moves out of a current tracking area.

In some feasible embodiments, the request message may be an RRC message, for example: an RRC connection setup request, used to request to establish an RRC connection to a network element of the serving access network device; an RRC connection re-establishment request, used to request to re-establish an RRC connection to a network element of the serving access network device; RRC connection setup complete, used to indicate that a process of establishing an RRC connection to a network element of the serving access network device is complete; or capability information transmission of the terminal device, used to notify the serving access network device of capability information of the terminal device. This is not limited herein.

Further, the request message may include but is not limited to the following information: a temporary identifier of the terminal device, allocated to the terminal device by the core network, and used to uniquely indicate the terminal device connected to the network element; a serving access network device identifier, used to identify the serving access network device in a globally unique manner; a cell identifier, used to identify the cell in a globally unique manner; a network slice identifier; or a network slice service area identification information request, used to request the core network to deliver a network slice service area identifier supported by the serving access network device and/or the cell. In some feasible embodiments, the request message is not limited to the foregoing messages, and is not limited herein.

302. The terminal device receives the network slice configuration information from the core network.

In some feasible embodiments, the core network may reply to the terminal device with a message, and the message includes network slice information. Further, the message may be a NAS message, for example: attach permission, used to indicate that the CN grants the attach request of the terminal device; service request permission, used to indicate that the CN grants the service request of the terminal device; or session establishment, used to indicate that the CN establishes a session for the terminal device.

Further, the message includes but is not limited to the following information: a serving access network device identifier, used to identify the serving access network device in a globally unique manner; or network slice service area identification information supported by a serving cell and a neighboring cell, such as network slice service area identification information supported in a list of all frequencies or frequency channel numbers supported by the serving cell and the neighboring cell. In some feasible embodiments, the message may further include other required information. This is not limited herein. The terminal device may store the received network slice information, and the network slice information includes the network slice service area identification information.

303. The terminal device determines a target cell based on the network slice configuration information and a network slice service area identifier, where the network slice configuration information includes a correspondence among a network slice, an area, and a service.

304. The terminal device accesses the target cell.

In this embodiment, step 303 and step 304 are the same as step 203 and step 204 in the foregoing embodiment, and details are not described herein.

III. The terminal device obtains related information from a serving access network device.

401. The terminal device sends an indication message to the serving access network device, where the indication message is used to indicate a requirement for a network slice.

In this embodiment of this aspect, the terminal device may notify the serving access network device of network slice requirement information, so that the serving access network device senses the requirement of the terminal device for the network slice, so as to improve mobility.

In this embodiment of this application, the terminal device may first synchronize with the serving access network device, for example, perform detection on a primary synchronization signal and a secondary synchronization signal, and perform correction in time domain and frequency domain, so as to obtain information such as a corresponding frequency channel number and bandwidth.

Then, the terminal device sends the indication message to the serving access network device, to indicate information about the requirement of the terminal device for the network slice. Further, the message may be sent by using a random access resource, such as a specific random access preamble or a specific random access time-frequency resource. The message may alternatively be a MAC control element message, and the message may be an RRC message, for example: an RRC connection setup request, used to request to establish an RRC connection to a network element of the serving access network device; an RRC connection re-establishment request, used to request to re-establish an RRC connection to a network element of the serving access network device; RRC connection setup complete, used to indicate that a process of establishing an RRC connection to a network element of the serving access network device is complete; or capability information transmission of the terminal device, used to notify the serving access network device of capability information of the terminal device. This is not limited herein.

Further, the indication message may include but is not limited to the following messages: a service area identifier of a network slice that is serving the terminal device; information about a frequency or frequency channel number corresponding to the service area identifier of the network slice that is serving the terminal device; a service area identifier of a network slice required by the terminal device; information about a frequency or frequency channel number corresponding to the service area identifier of the network slice required by the terminal device; and a network slice service area priority, used to indicate a priority corresponding to a network slice service area identifier, for example, a priority of a network slice A is higher than that of a network slice B.

In this embodiment of this application, the serving access network device may store the indication information. Optionally, a network element on an access network side may obtain, for handover preparation, information about a requirement capability of the terminal device for the network slice. This is not limited herein.

402. The terminal device obtains a network slice service area identifier from a serving access network device corresponding to a serving cell in which the terminal device is located, where the network slice service area identifier is used to indicate an area served by a network slice.

403. The terminal device determines a target cell based on network slice configuration information and the network slice service area identifier, where the network slice configuration information includes a correspondence among a network slice, an area, and a service.

404. The terminal device accesses the target cell.

In this embodiment, step 402 to step 404 are the same as step 202 to step 204 in the foregoing embodiment, and details are not described herein.

The foregoing separately describes different embodiments of a method for obtaining network slice information by a terminal device in the embodiments of the present invention, and the following describes a network slice information exchange between network devices in the embodiments of the present invention. Network devices exchange network slice information in different manners, and the manners are separately described in the following.

1. A serving access network device sends network slice information to a target network device.

Figure 5:
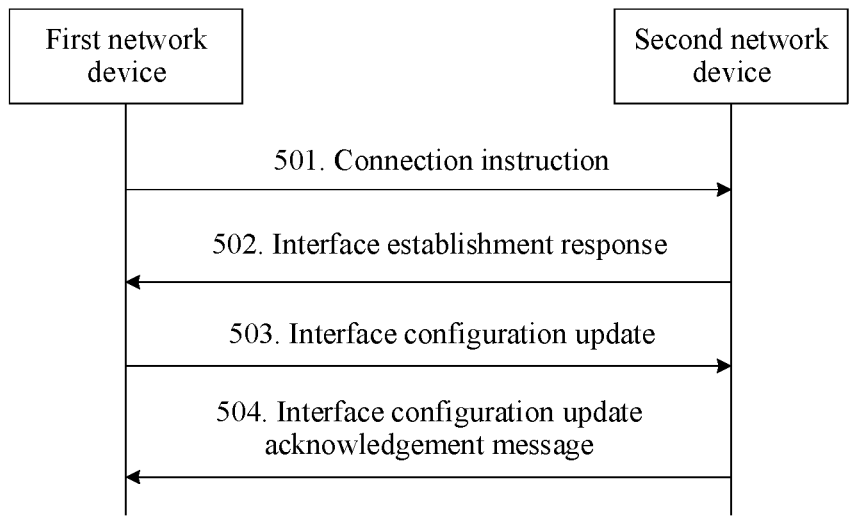
FIG. 5 is a schematic diagram of another embodiment of a target cell access method according to an embodiment of this application.

In the embodiments of this application, two serving access network devices may exchange the network slice information, so that a first serving access network device learns of slice coverage information of a second serving access network device. Referring to FIG. 5, another embodiment of a target cell access method in an embodiment of this application includes the following steps.

501. The serving access network device sends a connection indication to the target network device, where the connection indication is used to instruct the target network device to connect to a terminal device.

In this embodiment of this application, the serving access network device includes a serving access network device, and the target network device includes a serving access network device or a core network. When the serving access network device is the first serving access network device, and the target network device is a second RAN network element, in some feasible embodiments, the serving access network device initiates an interface establishment request to the target network device. The interface establishment request includes network slice information, and is used to exchange configurations on application sides of two connected serving access network devices. Further, the message includes but is not limited to the following information: a serving access network device identifier, used to identify the serving access network device in a globally unique manner; information about a serving cell and a neighboring cell of each serving cell, for example, cell identifiers, physical cell identifiers, information about frequency channel numbers, tracking area codes, and supported network slice service area identification information respectively corresponding to the serving cell and the neighboring cell of each serving cell; or a network slice service area priority, used to indicate a priority corresponding to a network slice service area identifier, for example, a priority of a network slice service area A is higher than that of a network slice service area B.

502. The target network device may send an interface establishment request response to the serving access network device, to exchange configurations on application sides of two connected serving access network devices.

Further, the message includes but is not limited to the following information: a serving access network device identifier, used to identify the serving access network device in a globally unique manner; information about a serving cell and a neighboring cell of each serving cell, for example, cell identifiers, physical cell identifiers, information about frequency channel numbers, tracking area codes, and supported network slice service area identification information respectively corresponding to the serving cell and the neighboring cell of each serving cell; or a network slice service area priority, used to indicate a priority corresponding to a network slice service area identifier, for example, a priority of a network slice service area A is higher than that of a network slice service area B.

503. The serving access network device initiates an interface configuration update to the target network device, to transmit updated information.

Further, the message includes but is not limited to the following information: a serving access network device identifier, used to identify the serving access network device in a globally unique manner; change information of information about a serving cell and a neighboring cell of each serving cell, used to perform an operation such as adding a new cell, modifying an existing cell configuration, or deleting a cell, for example, cell identifiers, physical cell identifiers, information about frequency channel numbers, tracking area codes, and supported network slice service area identification information respectively corresponding to the serving cell and the neighboring cell of each serving cell; or a network slice service area priority, used to indicate a priority corresponding to a network slice service area identifier, for example, a priority of a network slice service area A is higher than that of a network slice service area B.

504. The target network device initiates an interface configuration update acknowledgement message to the serving access network device, to acknowledge that a configuration update message of the serving access network device is received.

Optionally, if the target network device cannot support interface configuration update content initiated by the serving access network device, the target network device may reply with a failure message, to indicate that a configuration update of the serving access network device fails.

After obtaining the network slice information, the terminal device determines a target network slice based on a target area, a target service, and the network slice information, and the target network slice is used to carry the target service in the target area. When the terminal device is located in the target area and uses the target service, the terminal device is associated with the target network slice.

II. A serving access network device sends a handover request to a target network device.

Figure 6:
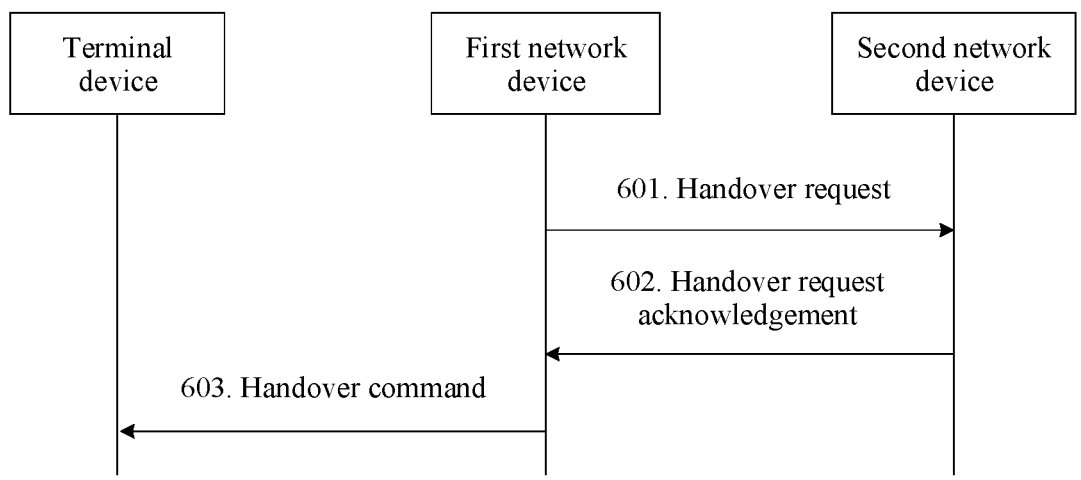
FIG. 6 is a schematic diagram of another embodiment of a target cell access method according to an embodiment of this application.

In an embodiment of this application, in a handover process, the serving access network device and the target network device may exchange a service area identifier of a network slice that is serving a terminal device or that is required by a terminal device. A target serving access network device may consider the information to optimize mobility. For example, in a handover preparation phase, a target RAN device preferentially uses, as a new target RAN device after handover, a network device corresponding to the service area identifier of the network slice that is serving the terminal device or that is required by the terminal device. Referring to FIG. 6, another embodiment of a target cell access method in an embodiment of this application includes the following steps.

601. The serving access network device sends a handover request to the target network device. The handover request includes a connection indication.

The serving access network device may send the handover request to the target network device, to initiate handover preparation. Further, the message includes but is not limited to the following information:

service area identification information of a network slice that is serving the terminal device;

service area identification information of a network slice required by the terminal device;

a network slice service area priority, used to indicate a priority corresponding to a network slice service area identifier, for example, a priority of a network slice service area A is higher than that of a network slice service area B;

a cause for handover, used to indicate a cause for handover this time, for example, a cause on a radio network layer (such as handover triggered caused by a signal or resource optimization);

a target cell identifier, used to uniquely indicate an identifier of a target cell; a handover restriction list, including a serving PLMN, an equivalent PLMN, a list of forbidden or allowed tracking areas, a list of forbidden or allowed cells, or the like;

a temporary identifier corresponding to the terminal device, used by a core network to search for a stored context of the terminal device;

an identifier of a core network control function entity associated with the terminal device;

a network slice identifier corresponding to one or more or all network slices selected by the terminal device;

information of a bearer that needs to be established and that is corresponding to one or more or all network slices selected by the terminal device, for example, a bearer identifier, a bearer level QoS (quality of service) parameter, an endpoint of a tunnel, or bearer level security information, for example, a ciphering function enabling option, where a location of a ciphering function is in the serving access network device and/or the core network, a header compression function enabling option, where a location of a header compression function is in the serving access network device and/or the core network, or an integrity protection enabling option, where a location of integrity protection is in the serving access network device and/or the core network;

session information that needs to be established and that is corresponding to one or more or all network slices selected by the terminal device, for example, a session identifier, a session level QoS (quality of service) parameter, an endpoint of a tunnel, or a session level security information, for example, a ciphering function enabling option, where a ciphering function is located in the serving access network device and/or the core network, a header compression function enabling option, where a location of a header compression function is in the serving access network device and/or the core network, or an integrity protection enabling option, where a location of integrity protection is in the serving access network device and/or the core network;

information of flow that needs to be established and that is corresponding to one or more or all network slices selected by the terminal device, for example, a flow identifier, a flow level QoS parameter, an endpoint of a tunnel, or flow level security information, for example, a ciphering function enabling option, where a location of a ciphering function is in the serving access network device and/or the core network, a header compression function enabling option, where a location of a header compression function is in the serving access network device and/or the core network, or an integrity protection enabling option, where a location of integrity protection is in the serving access network device and/or the core network; or context information of the terminal device, for example, a network slice identifier corresponding to one or more or all network slices subscribed by the terminal device which is not limited herein.

602. The target network device replies to the serving access network device with handover request acknowledgement, to indicate that the target network device has prepared resources.

Further, the message includes but is not limited to the following information:

an old serving access network device identifier;

a new serving access network device identifier;

a transparent container (container) from a target node to a source node, including an RRC handover command;

a network slice service area identifier, a list of a bearer, a session, and/or a flow that are/is not admitted, and the network slice service area identifier, the bearer, session, and/or flow are/is corresponding to one or more or all network slices selected by the terminal device; or information of a bearer, a session, and/or a flow that is admitted, and the bearer, session, and/or flow are/is corresponding to the one or more or all network slices selected by the terminal device, for example, a bearer identifier, a session identifier, a flow identifier, a bearer level QoS parameter, or an endpoint of a tunnel which is not limited herein.

603. The serving access network device sends a handover command to the terminal device. The handover command includes a target network slice service area identifier. The handover command instructs the terminal device to handover to the target network device.

The serving access network device may initiate an RRC message to the terminal device, to carry the handover command. Further, the message includes but is not limited to the following information: network slice service area identification information supported by the target cell; the target cell identifier; a new temporary identifier of the terminal device; or a bearer configuration, for example, configuration on a PDCP, a Radio Link Control (RLC) protocol, Media Access Control (MAC), and a physical layer.

The terminal device establishes an RRC connection to the target network device, and initiates a handover complete message such as RRC connection reconfiguration complete to the target network device, to indicate that handover is complete.

Optionally, in some feasible embodiments, when a process of handover using an interface between a RAN device and a CN device needs to be triggered, for example, when there is no direct terrestrial side interface or no wireless backhaul link between the serving access network device and the target network device, the serving access network device may further initiate a handover request to the CN device. For specific message content, refer to the handover request message in step 601, where the message is used to initiate handover preparation. The CN device forwards the received message to the target network device, and the target network device replies to the CN device with handover request acknowledgement, to indicate that the target network device has prepared the resources. For specific message content, refer to the handover request acknowledgement message in step 602. Then, the CN device forwards the received message to the serving access network device.

II. A serving access network device sends a node addition request to a target network device.

Figure 7:
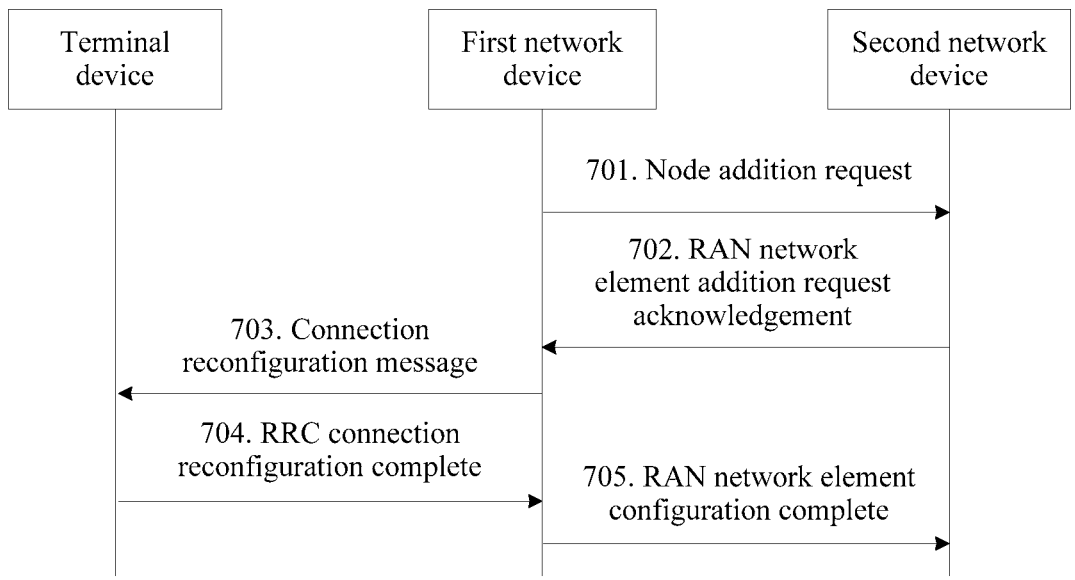
FIG. 7 is a schematic diagram of another embodiment of a target cell access method according to an embodiment of this application.
Figure 8:
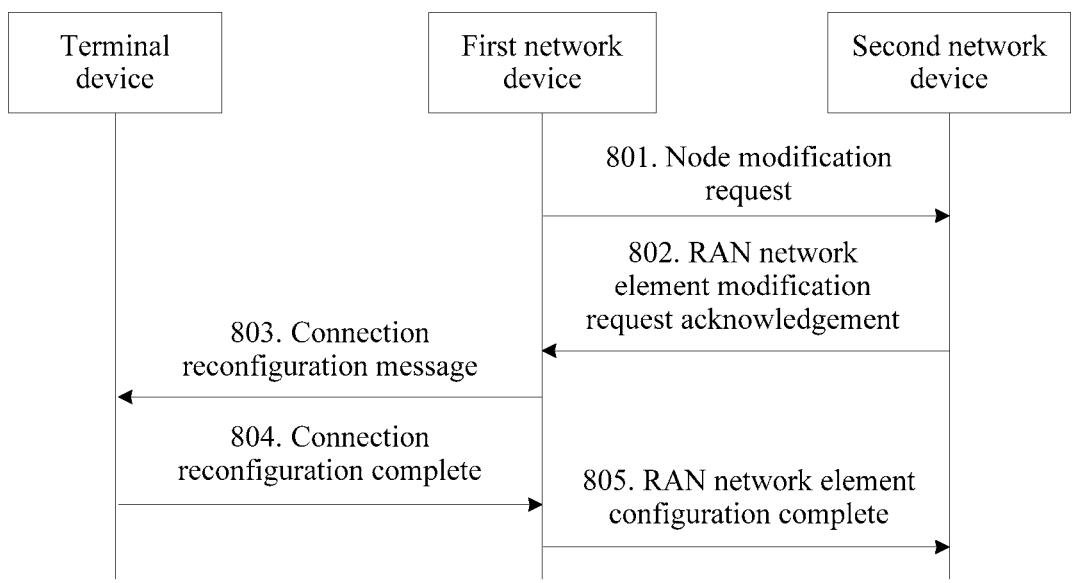
FIG. 8 is a schematic diagram of another embodiment of a target cell access method according to an embodiment of this application.
Figure 9:
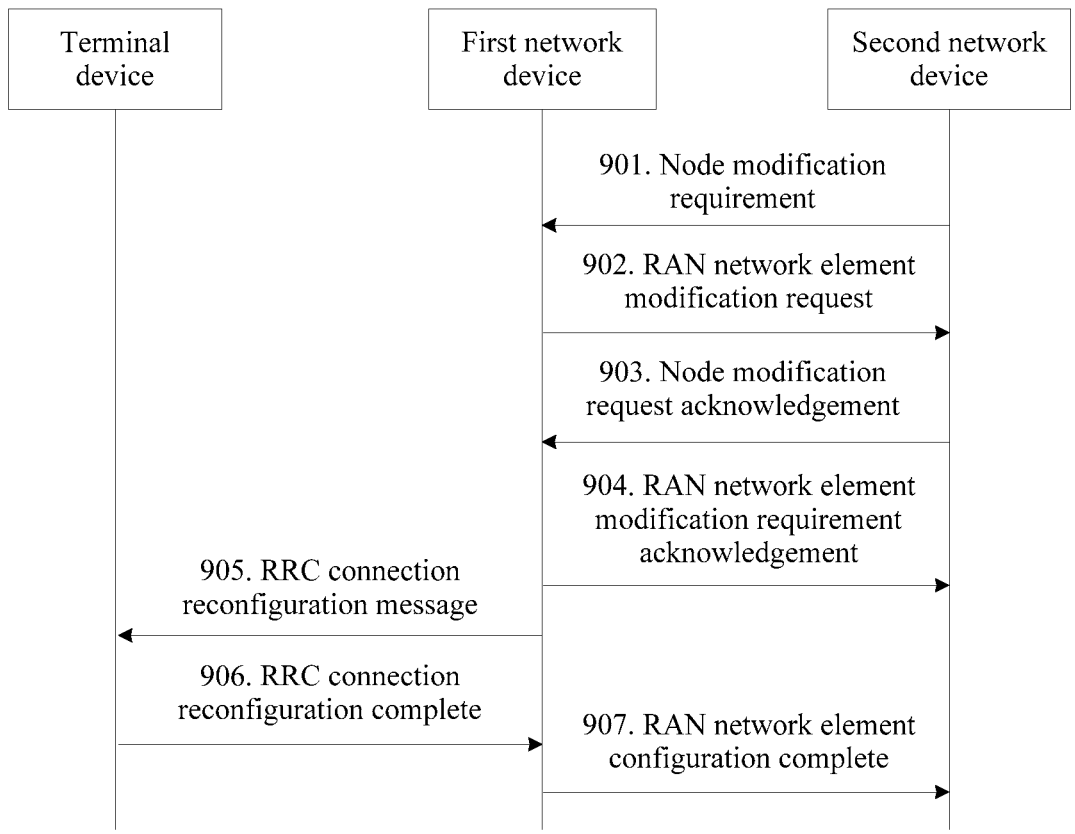
FIG. 9 is a schematic diagram of another embodiment of a target cell access method according to an embodiment of this application.

In an embodiment of this application, two network devices may exchange a service area identifier of a network slice that is serving a terminal device or that is required by a terminal device, where the serving access network device may trigger the target network device to perform a multi-connection operation or directly modify information about the target network device. Referring to FIG. 7, another embodiment of a target cell access method in an embodiment of this application includes the following steps.

701. The serving access network device sends a node addition request to the target network device. The node addition request includes a connection indication.

The serving access network device may send the node addition request to the target network device, to request the target network device to establish a multi-connection operation, so as to allocate a radio resource for the terminal device. Further, the message includes but is not limited to the following information:

identification information of a network slice that is serving the terminal device;

identification information of a network slice that the terminal device is allowed to access;

service area identification information of the network slice that is serving the terminal device;

service area identification information of a network slice required by the terminal device;

a network slice service area priority, used to indicate a priority corresponding to a network slice service area identifier, for example, a priority of a network slice service area A is higher than that of a network slice service area B;

configuration information of a network slice corresponding to a network slice identifier, for example, a physical random access channel (PRACH) configuration, a random access preamble configuration, a configuration related to security, or a configuration related to radio resource management, which is not limited herein; a security capability of the terminal device, used to indicate a ciphering algorithm and an integrity protection algorithm that are supported by the terminal device;

a security key of the target network device, used by the target network device to perform data encryption for the terminal device;

an aggregate maximum bit rate of the terminal device applicable to the target network device, including an uplink aggregate maximum bit rate and a downlink aggregate maximum bit rate;

a serving PLMN, used to indicate a PLMN corresponding to a radio bearer that needs to be established by the target network device;

information of a bearer that needs to be established and that corresponds to one or more or all network slices selected by the terminal device, session information, and/or flow information, for example, a bearer type, such as, a master cell group bearer, a secondary cell group bearer, or a split bearer, a bearer identifier, information about quality of service corresponding to a bearer, an endpoint of a tunnel, a session identifier, a flow identifier, information about quality of service corresponding to a session, information about quality of service corresponding to a flow, information about security of bearer level, session level, or flow level, for example, a ciphering function enabling option, where a location of a ciphering function is in the serving access network device and/or a core network, a header compression function enabling option, where a location of a header compression function is in the serving access network device and/or a core network, or an integrity protection enabling option, where a location of integrity protection is in the serving access network device and/or a core network; or a handover restriction list, including a serving PLMN, an equivalent PLMN, a list of forbidden or allowed tracking areas, a list of forbidden or allowed cells, or the like which are not limited herein.

702. The target network device replies a serving access network device addition request acknowledgement to the serving access network device, to indicate that the target network device has prepared resources.

Further, the message includes but is not limited to the following information: a list of a bearer, a session, and/or a flow that is not admitted, and the bearer, session and/or flow are/is corresponding to one or more or all network slices selected by the terminal device; information of a bearer, a session, and/or a flow that is admitted, and the bearer, session and/or flow that are/is corresponding to the one or more or all network slices selected by the terminal device, for example, a bearer identifier, a session identifier, a flow identifier, bearer level QoS parameter, or an endpoint of a tunnel; or a transparent container from a target node to a source node, including bearer configuration information generated by the target network device.

Further, if the target network device cannot support any received network slice, radio bearer, session, flow, or the like, or an error occurs during a process, the target network device replies with a rejection message carrying a cause, for example, the network slice, the radio bearer, the session, the flow, or the like cannot be supported.

703. The serving access network device sends a connection reconfiguration message to the terminal device. The connection reconfiguration message includes a target network slice service area identifier. The connection reconfiguration message is used to instruct the terminal device to connect to the target network device.

In some feasible embodiments, the serving access network device may initiate an RRC connection reconfiguration message to the terminal device. The RRC connection reconfiguration message carries radio resource configuration information, used to instruct the terminal device to perform radio resource configuration based on the received message. Further, the message includes but is not limited to the following information: a network slice service area identifier supported by the target network device; a target cell identifier; a new temporary identifier of the terminal device; or a bearer configuration, for example, configurations on a PDCP, RLC, MAC, and a physical layer.

704. The terminal device replies to the serving access network device with RRC connection reconfiguration complete, to indicate that the terminal device completes radio resource configuration.

705. The serving access network device sends serving access network device configuration complete to the target network device, to indicate that the terminal device has completed the radio resource configuration.

IV. A serving access network device sends a serving access network device modification request to a target network device.

801. The serving access network device sends a node modification request to the target network device, where the node modification request is used to instruct the target network device to modify a radio resource configuration of the target network device for a terminal device.

In some feasible embodiments, two network devices may exchange a service area identifier of a network slice that is serving the terminal device or that is required by the terminal device, and a primary serving access network device triggers a secondary serving access network device to modify a current multi-connection operation. Specifically, the serving access network device initiates the serving access network device modification request to the target network device, to request the target network device to modify current context information of the terminal device and radio resource allocation prepared by the target network device for the terminal device. Further, the message includes but is not limited to the following information:

identification information of a network slice that is serving the terminal device; identification information of a network slice that the terminal device is allowed to access;

service area identification information of the network slice that is serving the terminal device;

service area identification information of a network slice required by the terminal device;

a network slice service area priority, used to indicate a priority corresponding to a network slice service area identifier, for example, a priority of a network slice service area A is higher than that of a network slice service area B;

a secondary cell group bearer modification indication, used to indicate whether a secondary cell group bearer needs to be modified;

a security capability of the terminal device, used to indicate a ciphering algorithm and an integrity protection algorithm that are supported by the terminal device;

a security key of the target network device, used by the target network device to perform data ciphering on the terminal device;

an aggregate maximum bit rate of the terminal device applicable to the target network device, including an uplink aggregate maximum bit rate and a downlink aggregate maximum bit rate;

information of a bearer that needs to be established, modified, or released and that is corresponding to one or more or all network slices selected by the terminal device, session information, and/or flow information, for example, a bearer type, such as, a master cell group bearer, a secondary cell group bearer, a split bearer, a bearer identifier, information about quality of service corresponding to a bearer, an endpoint of a tunnel, a session identifier, a flow identifier, information about quality of service corresponding to a session, information about quality of service corresponding to a flow, information about security of a bearer level, session level, or flow level, for example, a ciphering function enabling option, where a location of a ciphering function is in the serving access network device and/or a core network, a header compression function enabling option, where a location of a header compression function is in the serving access network device and/or a core network, or an integrity protection enabling option, where a location of integrity protection is in the serving access network device and/or a core network; or a handover restriction list, including a serving PLMN, an equivalent PLMN, a list of forbidden or allowed tracking areas, a list of forbidden or allowed cells, or the like. This is not limited herein.

802. The target network device replies to the serving access network device with serving access network device modification request acknowledgement, to acknowledge the modification request of the target network device.

Further, the message includes but is not limited to the following information: a list of a bearer, a session, and/or a flow that is not admitted, and the bearer, session, and/or flow are/is corresponding to one or more or all network slices selected by the terminal device; information of a bearer, a session, and/or a flow that is admitted, and the bearer, session, and/or flow are/is corresponding to the one or more or all network slices selected by the terminal device, for example, admitted bearer information, admitted session information, and/or admitted flow information that need/needs to be added, modified, or released, a bearer identifier, a session identifier, a flow identifier, a bearer level QoS parameter, or an endpoint of a tunnel; or a transparent container from a target node to a source node, including bearer configuration information generated by the target network device. Further, if the target network device cannot support any received network slice, radio bearer, session, flow, or the like, or an error occurs in a process, the target network device replies with a rejection message carrying a cause, for example, the network slice, the radio bearer, the session, the flow, or the like cannot be supported. This is not limited herein.

803. The serving access network device sends a connection reconfiguration message to the terminal device, where the connection reconfiguration message includes the radio resource configuration.

Further, the message includes but is not limited to the following information: a network slice service area identifier supported by the target network device; a target cell identifier; a new temporary identifier of the terminal device; or a bearer configuration, for example, configurations on a PDCP, RLC, MAC, and a physical layer.

804. The terminal device replies to the serving access network device with connection reconfiguration complete, to indicate that the terminal device completes radio resource configuration.

805. The serving access network device sends serving access network device configuration complete to the target network device, to indicate that the terminal device completes the radio resource configuration.

V. A serving access network device receives a node modification request message sent by a target network device.

901. The serving access network device receives a node modification request sent by the target network device.

In some feasible embodiments, two network devices may exchange a service area identifier of a network slice that is serving a terminal device or that is required by a terminal device, and a secondary serving access network device initiates modification of a current multi-connection operation. Specifically, the serving access network device may initiate the node modification request to the target network device, to trigger to release a radio resource, modify a primary serving cell, invert a Packet Data Convergence Protocol (PDCP) sequence number, or the like.

Further, the message includes but is not limited to the following information:

identification information of a network slice that is serving the terminal device;

identification information of a network slice that the terminal device is allowed to access;

service area identification information of the network slice that is serving the terminal device;

service area identification information of a network slice required by the terminal device;

a network slice service area priority, used to indicate a priority corresponding to a network slice service area identifier, for example, a priority of a network slice service area A is higher than that of a network slice service area B;

a secondary cell group bearer modification indication, used to indicate whether a secondary cell group bearer needs to be modified;

information of a bearer that needs to be released and that is corresponding to one or more or all network slices selected by the terminal device, session information, and/or flow information, for example, a bearer type, such as, a master cell group bearer, a secondary cell group bearer, a split bearer, a bearer identifier, information about quality of service corresponding to a bearer, an endpoint of a tunnel, a session identifier, a flow identifier, information about quality of service corresponding to a session, information about quality of service corresponding to a flow, information about security of a bearer level, session level, or flow level, for example, a ciphering function enabling option, where a location of a ciphering function is in the serving access network device and/or a core network, a header compression function enabling option, where a location of a header compression function is in the serving access network device and/or a core network, or an integrity protection enabling option, where a location of integrity protection is in the serving access network device and/or a core network; or a handover restriction list, including a serving PLMN, an equivalent PLMN, a list of forbidden or allowed tracking areas, a list of forbidden or allowed cells, or the like.

902. The serving access network device initiates a serving access network device modification request to the target network device.

Optionally, when a data forwarding address, a security key of a secondary RAN device, or the like needs to be provided, the serving access network device initiates a RAN device modification request to the target network device, to request the target network device to modify current context information of the terminal device and radio resource allocation prepared by the target network device for the terminal device.

Further, the message includes but is not limited to:

identification information of a network slice that is serving the terminal device;

identification information of a network slice that the terminal device is allowed to access;

service area identification information of the network slice that is serving the terminal device;

service area identification information of a network slice required by the terminal device;

a network slice service area priority, used to indicate a priority corresponding to a network slice service area identifier, for example, a priority of a network slice service area A is higher than that of a network slice service area B;

a secondary cell group bearer modification indication, used to indicate whether a secondary cell group bearer needs to be modified;

a security capability of the terminal device, used to indicate a ciphering algorithm and an integrity protection algorithm that are supported by the terminal device;

a security key of the target network device, used by the target network device to perform data ciphering on the terminal device;

an aggregate maximum bit rate of the terminal device applicable to the target network device, including an uplink aggregate maximum bit rate and a downlink aggregate maximum bit rate;

information of a bearer that needs to be established, modified, or released and that is corresponding to one or more or all network slices selected by the terminal device, session information, and/or flow information, for example, a bearer type, such as, a master cell group bearer, a secondary cell group bearer, a split bearer, a bearer identifier, information about quality of service corresponding to a bearer, an endpoint of a tunnel, a session identifier, a flow identifier, information about quality of service corresponding to a session, information about quality of service corresponding to a flow, information about security of a bearer level, a session level, or a flow level, for example, a ciphering function enabling option, where a location of a ciphering is in a RAN device and/or a CN device, a header compression function enabling option, where a location of a header compression function is in a RAN device and/or a CN device, or an integrity protection enabling option, where a location of integrity protection is in a RAN device and/or a CN device; or a handover restriction list, including a serving PLMN, an equivalent PLMN, a list of forbidden or allowed tracking areas, a list of forbidden or allowed cells, or the like.

903. The target network device replies to the serving access network device with node modification request acknowledgement, to indicate that the target network device has prepared resources.

Further, the message includes but is not limited to the following information: a list of a bearer, a session, and/or a flow that is not admitted, and the bearer, session, and/or flow are/is corresponding to one or more or all network slices selected by the terminal device; information of a bearer, session, and/or flow that is admitted, and the bearer, session, and/or flow is corresponding to the one or more or all network slices selected by the terminal device, for example, admitted bearer information, admitted session information, and/or admitted flow information that need/needs to be added, modified, or released, a bearer identifier, a session identifier, a flow identifier, a bearer level QoS parameter, or an endpoint of a tunnel; or a transparent container from a target node to a source node, including bearer configuration information generated by the target network device.

Further, if the target network device cannot support any received network slice, radio bearer, session, flow, or the like, or an error occurs in a process, the target network device replies with a rejection message carrying a cause, for example, the network slice, the radio bearer, the session, the flow, or the like cannot be supported.

904. The target network device replies to the serving access network device with serving access network device modification request acknowledgement, to acknowledge the modification request of the target network device.

Further, the message includes but is not limited to the following information: a list of a bearer, a session, and/or a flow that is not admitted, and the bearer, session, and/or flow are/is corresponding to one or more or all network slices selected by the terminal device; information of a bearer, session information, and/or flow that is admitted, and the bearer, session, and/or flow are/is corresponding to the one or more or all network slices selected by the terminal device, for example, admitted bearer information, admitted session information, and/or admitted flow information that need/needs to be added, modified, or released, a bearer identifier, a session identifier, a flow identifier, a bearer level QoS parameter, or an endpoint of a tunnel; or a transparent container from a target node to a source node, including bearer configuration information generated by the target network device.

Further, if the target network device cannot support any received network slice, radio bearer, session, flow, or the like, or an error occurs in a process, the target network device replies with a rejection message carrying a cause, for example, the network slice, the radio bearer, the session, the flow, or the like cannot be supported.

905. The serving access network device initiates an RRC connection reconfiguration message to a terminal device, where the RRC connection reconfiguration message carries radio resource configuration information, to instruct the terminal device to perform radio resource configuration based on the received message.

Further, the message includes but is not limited to the following information: a network slice service area identifier supported by the target network device; a target cell identifier; a new temporary identifier of the terminal device; or a bearer configuration, for example, configurations on a PDCP, RLC, MAC, and a physical layer. This is not limited herein.

906. The terminal device replies to the serving access network device with RRC connection reconfiguration complete, to indicate that the terminal device completes radio resource configuration.

907. The serving access network device sends serving access network device configuration complete to the target network device, to indicate that the terminal device completes the radio resource configuration.

Figure 10:
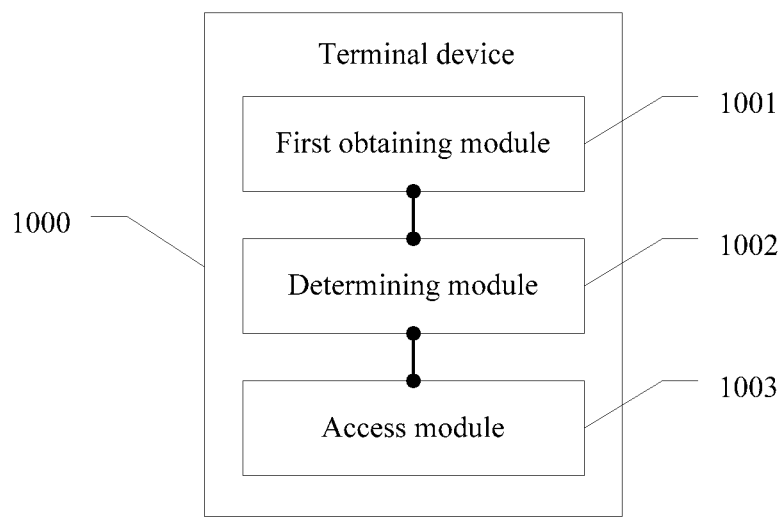
FIG. 10 is a schematic diagram of an embodiment of a terminal device 1000 according to an embodiment of this application.

The foregoing describes the target cell access method, and the following describes a related device. Referring to FIG. 10, FIG. 10 shows a terminal device 1000, including:

a first obtaining module 1001, configured to obtain a network slice service area identifier from a serving access network device corresponding to a serving cell in which the terminal device is located, where the network slice service area identifier is used to indicate an area served by a network slice;

a determining module 1002, configured to determine a target cell based on network slice configuration information and the network slice service area identifier, where the network slice configuration information includes a correspondence among a network slice, an area, and a service; and an access module 1003, configured to access the target cell.

Figure 11:
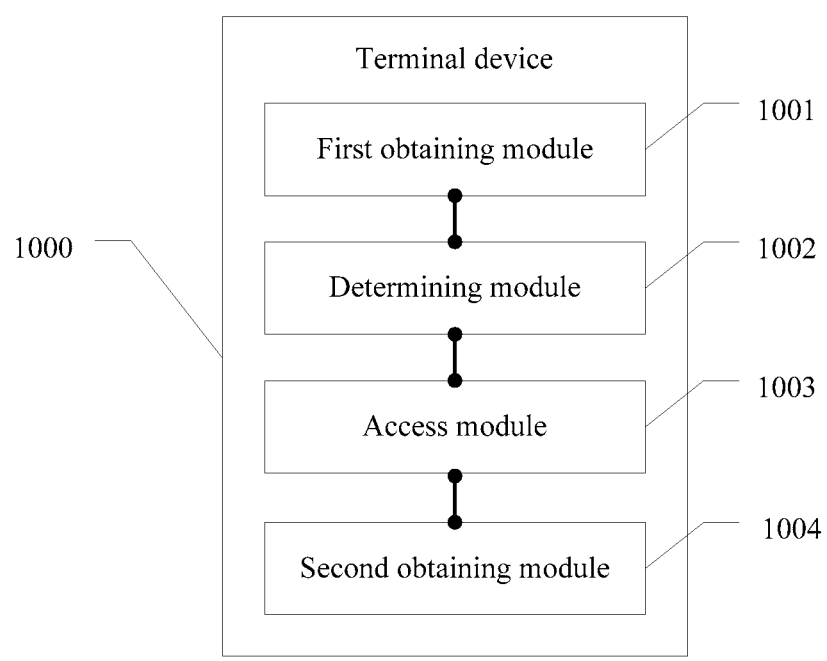
FIG. 11 is a schematic diagram of another embodiment of a terminal device 1000 according to an embodiment of this application.

Referring to FIG. 11, the terminal device 1000 further includes:

a second obtaining module 1004, configured to obtain the network slice configuration information from a core network.

Figure 12:
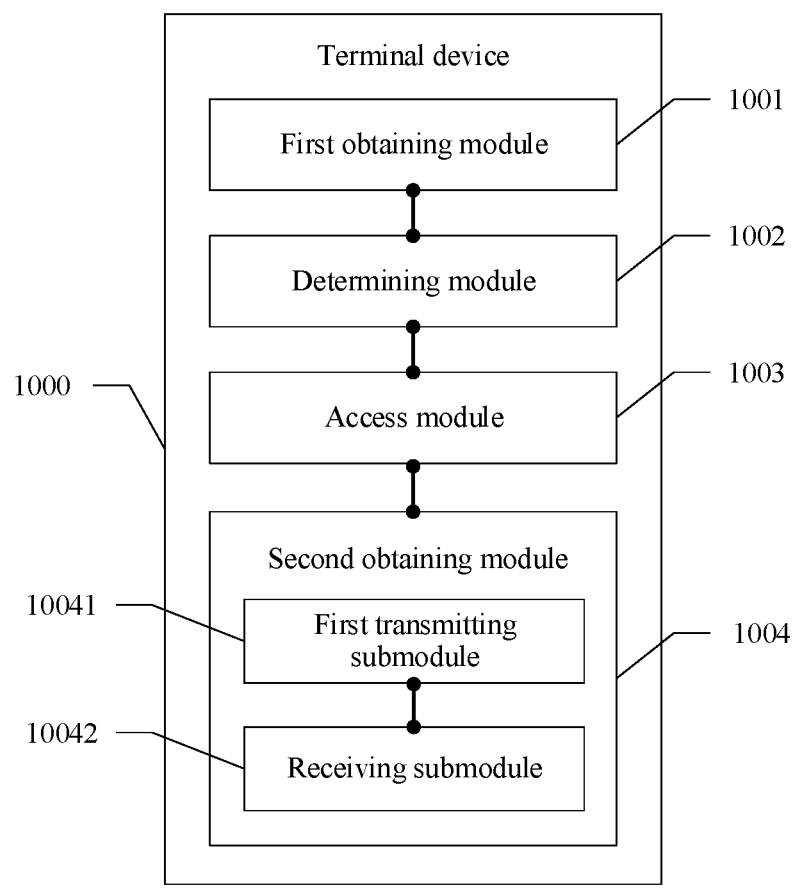
FIG. 12 is a schematic diagram of another embodiment of a terminal device 1000 according to an embodiment of this application.

Referring to FIG. 12, the second obtaining module 1004 includes:

a first transmitting submodule 10041, configured to send a request message to the core network, where the request message is used to request the network slice configuration information; and a receiving submodule 10042, configured to receive the network slice configuration information from the core network.

Figure 13:
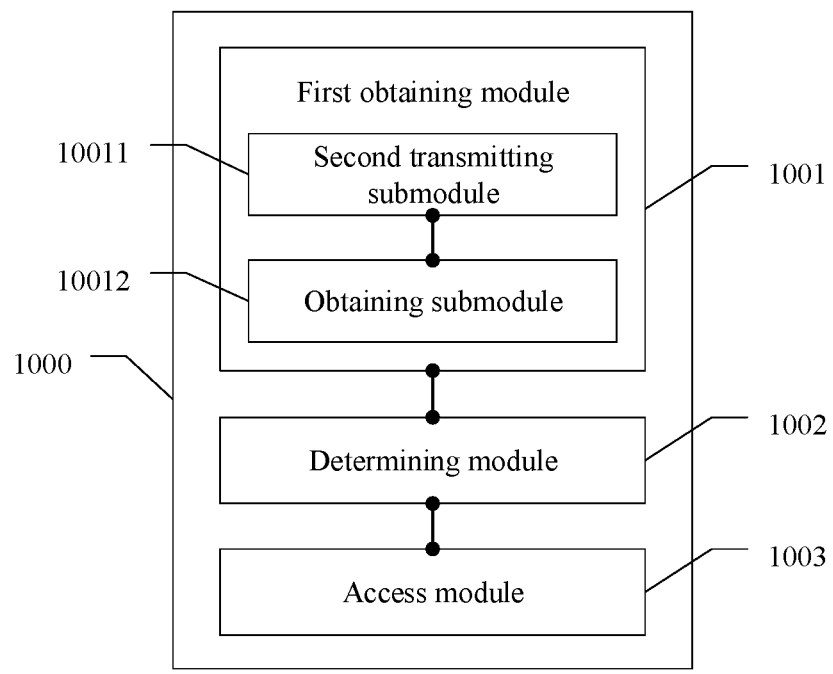
FIG. 13 is a schematic diagram of another embodiment of a terminal device 1000 according to an embodiment of this application.

Referring to FIG. 13, the first obtaining module 1001 includes:

a second transmitting submodule 10011, configured to send an indication message to the serving access network device, where the indication message is used to indicate a requirement for a network slice; and an obtaining submodule 10012, configured to obtain the network slice service area identifier from the serving access network device.

Figure 14:
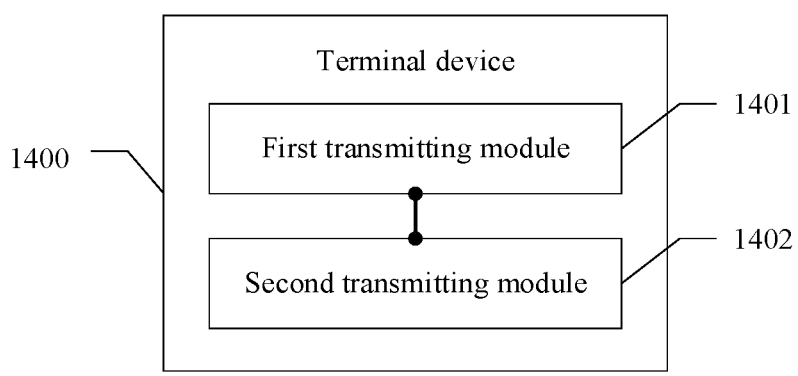
FIG. 14 is a schematic diagram of an embodiment of a serving access network device 1400 according to an embodiment of this application.

Referring to FIG. 14, FIG. 14 shows a serving access network device 1400, including:

a first transmitting module 1401, configured to send a connection indication to a target network device. The connection indication is used to instruct the target network device to connect to a terminal device; and a second transmitting module 1402, configured to send a target network slice service area identifier to the terminal device, where the target network slice service area identifier is used to indicate a target area, so that the terminal device determines a target cell based on network slice configuration information and the network slice service area identifier, where the network slice configuration information includes a correspondence among a network slice, an area, and a service.

Figure 15:
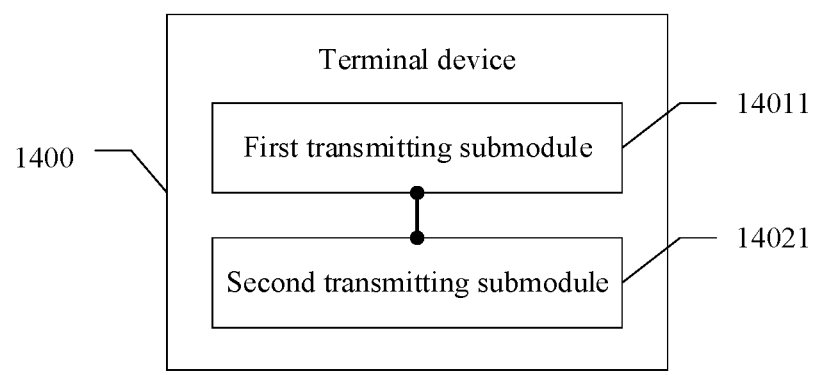
FIG. 15 is a schematic diagram of another embodiment of a serving access network device 1400 according to an embodiment of this application.

Referring to FIG. 15, the first transmitting module 1401 includes:

a first transmitting submodule 14011, configured to send a handover request to the target network device. The handover request includes the connection indication.

The second transmitting module 1402 includes:

a second transmitting submodule 14021, configured to send a handover command to the terminal device, where the handover command includes the target network slice service area identifier, and the handover command instructs the terminal device to handover to the target network device.

Figure 16:
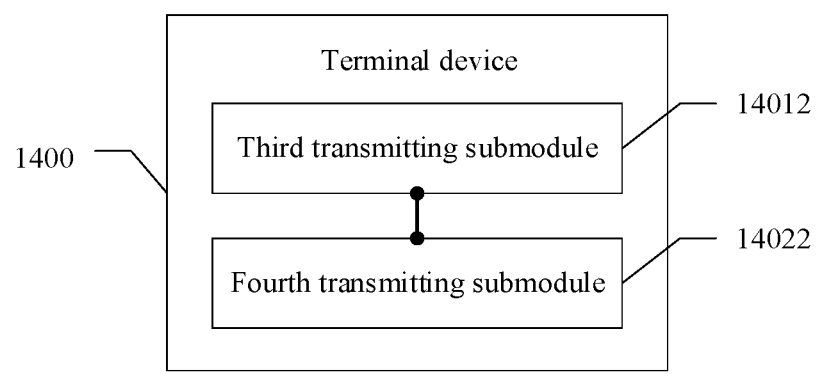
FIG. 16 is a schematic diagram of another embodiment of a serving access network device 1400 according to an embodiment of this application.

Referring to FIG. 16, the first transmitting module 1401 includes:

a third transmitting submodule 14012, configured to send a node addition request to the target network device, where the node addition request includes the connection indication.

The second transmitting module 1402 includes:

a fourth transmitting submodule 14022, configured to send a connection reconfiguration message to the terminal device, where the connection reconfiguration message includes the target network slice service area identifier, and the connection reconfiguration message is used to instruct the terminal device to connect to the target network device.

Figure 17:
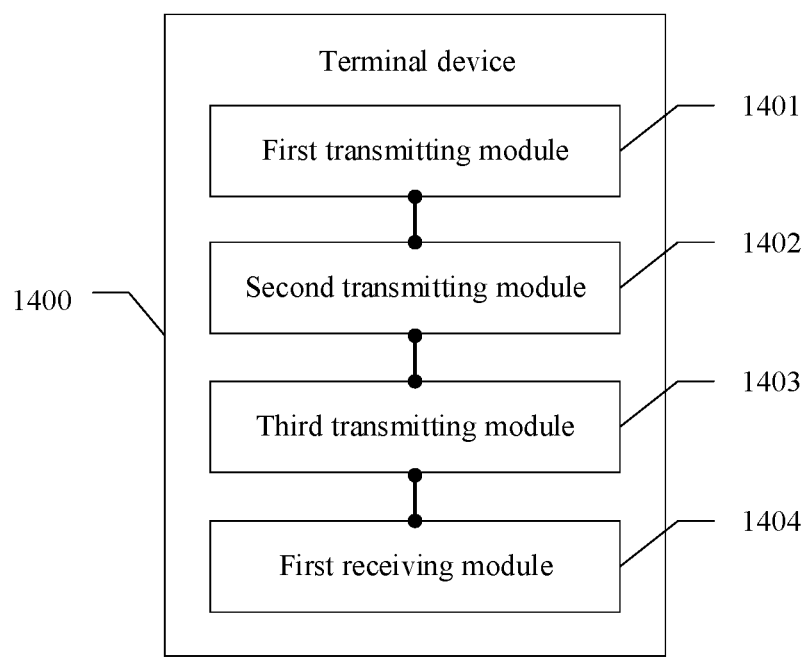
FIG. 17 is a schematic diagram of another embodiment of a serving access network device 1400 according to an embodiment of this application.

Referring to FIG. 17, the serving access network device 1400 further includes:

a third transmitting module 1403, configured to send a node modification request to the target network device, where the node modification request is used to instruct the target network device to modify a radio resource configuration of the target network device for the terminal device; and a first receiving module 1404, configured to send a connection reconfiguration message to the terminal device, where the connection reconfiguration message includes the radio resource configuration.

Figure 18:
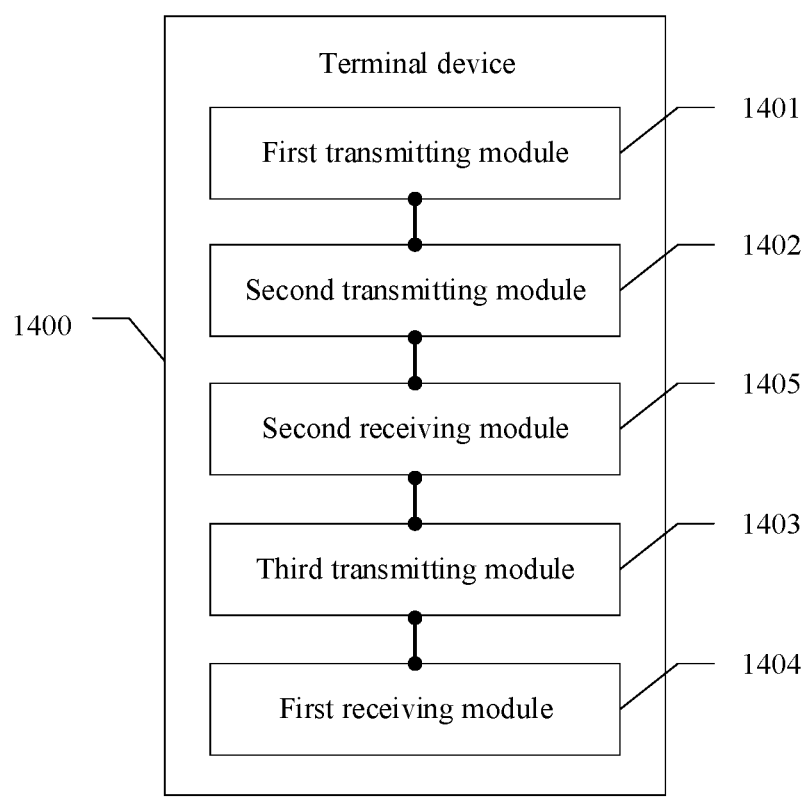
FIG. 18 is a schematic diagram of another embodiment of a serving access network device 1400 according to an FIG. 19 is a schematic diagram of another embodiment of a terminal device 1900 according to an embodiment of this application.

Referring to FIG. 18, the serving access network device 1400 further includes:

a second receiving module 1405, configured to receive a node modification request sent by the target network device.

Figure 19:
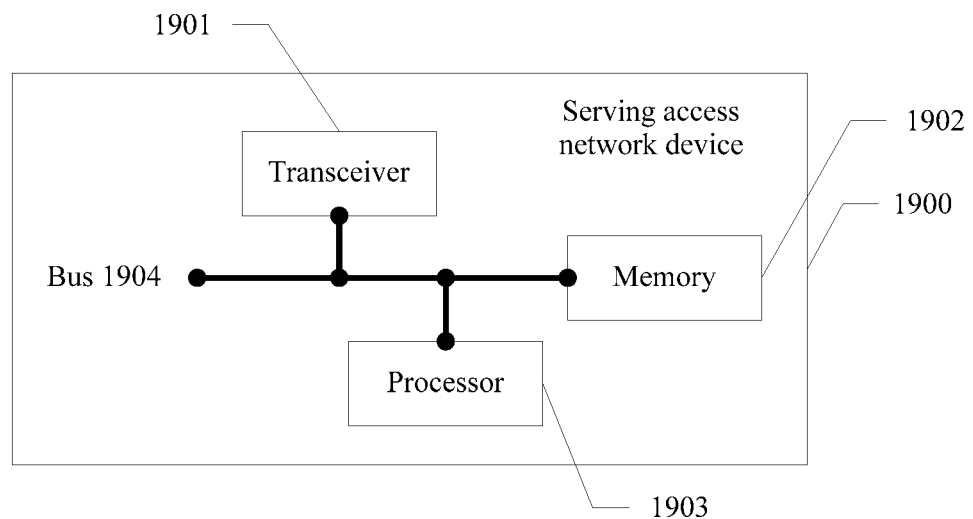

The foregoing describes the embodiments of this application from a perspective of a modular function entity, and the following describes the embodiments of this application from a perspective of hardware processing. Referring to FIG. 19, an embodiment of this application provides a terminal device 1900, including:

a transceiver 1901, a memory 1902, a processor 1903, and a bus 1904.

The transceiver 1901, the memory 1902, and the processor 1903 are connected by using the bus 1904.

The transceiver 1901 is configured to obtain a network slice service area identifier from a serving access network device corresponding to a serving cell in which the terminal device is located, where the network slice service area identifier is used to indicate an area served by a network slice.

The transceiver 1901 may include a communications interface between the processor 1903 and a standard communications subsystem.

The transceiver 1901 may further include a communications interface in an EIA-RS-232C standard, namely, a communications interface in a serial binary data exchange interface technology standard between data terminal equipment (DTE) and data circuit-terminating equipment (DCE), or may include a communications interface in an RS-485 protocol. This is not limited herein.

The processor 1903 is configured to: determine a target cell based on network slice configuration information and the network slice service area identifier, where the network slice configuration information includes a correspondence among a network slice, an area, and a service; and access the target cell.

The processor 1903 may be a central processing unit (CPU), a network processor (NP), or a combination of a CPU and an NP.

The processor 1903 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 1902 is configured to store a program, a target area, a target service, and the network slice configuration information.

The memory 1902 may include a volatile memory, for example, a random access memory (RAM). The memory 402 may also include a nonvolatile memory, for example, a flash memory, a hard disk (HDD), or a solid state drive (SSD). The memory 403 may further include a combination of the foregoing memories. This is not limited herein.

Optionally, the memory 1902 may be further configured to store a program instruction. The processor 403 may invoke the program instruction stored in the memory 1902, to perform the step or the optional implementation in the embodiment shown in FIG. 2, so that the terminal device 1900 implements the function in the foregoing method.

Figure 20:
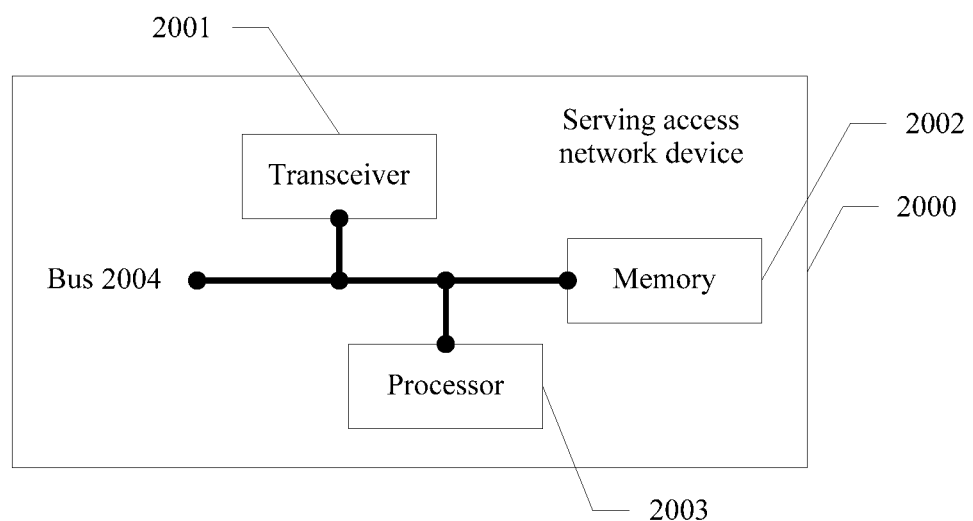
FIG. 20 is a schematic diagram of another embodiment of a serving access network device 2000 according to an embodiment of this application.

Referring to FIG. 20, FIG. 20 shows a serving access network device 2000, including:

a transceiver 2001, a memory 2002, a processor 2003, and a bus 2004.

The transceiver 2001, the memory 2002, and the processor are connected by using the bus.

The transceiver 2001 is configured to: send a connection indication to a target network device, where the connection indication is used to instruct the target network device to connect to a terminal device; and send a target network slice service area identifier to the terminal device, where the target network slice service area identifier is used to indicate a target area, so that the terminal device determines a target cell based on network slice configuration information and the network slice service area identifier, where the network slice configuration information includes a correspondence among a network slice, an area, and a service.

The transceiver 2001 may include a communications interface between the processor 2003 and a standard communications subsystem.

The transceiver 2001 may further include a communications interface in an EIA-RS-232C standard, namely, a communications interface in a serial binary data exchange interface technology standard between data terminal equipment (DTE) and data circuit-terminating equipment (DCE), or may include a communications interface in an RS-485 protocol. This is not limited herein.

The memory 2002 is configured to store a program, a target area, a target service, and the network slice configuration information.

The memory 2002 may include a volatile memory, for example, a random access memory (RAM). The memory 402 may also include a nonvolatile memory, for example, a flash memory, a hard disk drive (HDD), or a solid state drive (SSD). The memory 403 may further include a combination of the foregoing memories. This is not limited herein.

Optionally, the memory 2002 may be further configured to store a program instruction. The processor 403 may invoke the program instruction stored in the memory 2002, to perform the step or the optional implementation in the embodiment shown in FIG. 2, so that the serving access network device 2000 implements the function in the foregoing method.

The processor 2003 is configured to execute a function of the serving access network device.

The processor 2003 may be a central processing unit (CPU), a network processor (NP), or a combination of a CPU and an NP.

The processor 2003 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method for communications between a terminal device and an access network device, comprising:

sending, by a serving access network device to a target access network device, a node addition request message to request the target access network device to allocate a resource for multi-connection operation for a terminal device, wherein the node addition request message comprises identification information of a network slice that serves the terminal device, the identification information of the network slice comprises a network slice type, the node addition request message further comprises a security capability of the terminal device, a security key of the target access network device, an identifier of a session, and security information for the session, and wherein the security capability of the terminal device indicates a ciphering algorithm and an integrity protection algorithm supported by the terminal device, the security key of the target access network device is used by the target network device to perform data encryption for the terminal device, the security information for the session comprises a ciphering function enabling option indicating whether a ciphering function is enabled for the session and an integrity protection enabling option indicating whether integrity protection is enabled for the session;

sending, by the target access network device to the serving network device, an addition request acknowledgement message;

sending, by the serving access network device, a radio resource control (RRC) connection reconfiguration message to the terminal device, wherein the RRC connection reconfiguration message comprises information of a radio resource configuration;

receiving, by the serving access network device, a RRC connection reconfiguration complete message from the terminal device; and sending, by the serving access network device, a message indicating that the terminal device has completed the radio resource configuration.

2. The method according to claim 1, wherein the network slice type comprises: at least one of enhanced mobile broadband, ultra-reliable and low latency communications, or massive machine type communications.

3. The method according to claim 1, wherein the addition request acknowledgement message further comprises a list of one or more admitted sessions.

4. The method according to claim 1, wherein the addition request acknowledgement message further comprises a list of one or more not admitted flows.

5. The method according to claim 1, wherein the node addition request message further comprises information of a bearer that needs to be established, and wherein the bearer corresponds to the network slice that is serving the terminal device.

6. The method according to claim 5, wherein the information of the bearer comprises a bearer type, the bearer type comprises at least one of a secondary cell group (SCG) bearer or a split bearer.

7. The method according to claim 1, wherein the node addition request message further comprises quality of service information corresponding to a session.

8. The method according to claim 1, wherein the node addition request message further comprises a flow identifier associated with a flow and information of quality of service corresponding to the flow.

9. The method according to claim 1, wherein the radio resource configuration comprises a target cell identifier.

10. The method according to claim 1, wherein the addition request acknowledgement message further comprises an endpoint of a tunnel.

11. A system for communications between a terminal device and an access network device, comprising: a serving access network device and a target access network device;

the serving access network device comprises:
  at least one processor;
  a non-transitory computer-readable storage medium coupled to the at least one processor and storing programming instructions for execution by the at least one processor, the programming instructions instruct the serving access network device to:
    send a node addition request message to the target access network device to request the target access network device to allocate a resource for multi-connection operation for a terminal device, wherein the node addition request message comprises identification information of a network slice that serves the terminal device, the identification information of the network slice comprises a network slice type, the node addition request message further comprises a security capability of the terminal device, a security key of the target access network device, an identifier of a session, and security information for the session, and wherein the security capability of the terminal device indicates a ciphering algorithm and an integrity protection algorithm supported by the terminal device, the security key of the target access network device is used by the target network device to perform data encryption for the terminal device, the security information for the session comprises a ciphering function enabling option indicating whether a ciphering function is enabled for the session and an integrity protection enabling option indicating whether integrity protection is enabled for the session;
    send a radio resource control (RRC) connection reconfiguration message to the terminal device, wherein the RRC connection reconfiguration message comprises information of a radio resource configuration;
    receive a RRC connection reconfiguration complete message from the terminal device; and
    send a message indicating that the terminal device has completed the radio resource configuration to the target access network device; and the target access network device comprises:
  at least one processor;
  a non-transitory computer-readable storage medium coupled to the at least one processor and storing programming instructions for execution by the at least one processor, the programming instructions instruct the serving access network device to:
    send an addition request acknowledgement message to the serving network device.

12. The system according to claim 11, wherein the network slice type comprises at least one of enhanced mobile broadband, ultra-reliable and low latency communications, or massive machine type communications.

13. The system according to claim 11, wherein the node addition request message further comprises information of a bearer that needs to be established, and wherein the bearer corresponds to the network slice that is serving the terminal device.

14. The system according to claim 13, wherein the information of the bearer comprises a bearer type, the bearer type comprises at least one of a secondary cell group (SCG) bearer or a split bearer.

15. The system according to claim 11, wherein the node addition request message further comprises quality of service information corresponding to a session.

16. The system according to claim 11, wherein the radio resource configuration further comprises a target cell identifier.

17. The method according to claim 11, wherein the node addition request message further comprises a flow identifier associated with a flow and information of quality of service corresponding to the flow.

18. The system according to claim 11, wherein the addition request acknowledgement message further comprises a list of one or more admitted sessions corresponding to the network slice serving the terminal device.

19. The system according to claim 11, wherein the addition request acknowledgement message further comprises a list of one or more not admitted flows.

20. The system according to claim 11, wherein the addition request acknowledgement message further comprises an endpoint of a tunnel.

* * * * *